(12) United States Patent
Nix

(10) Patent No.: US 11,751,049 B2
(45) Date of Patent: Sep. 5, 2023

(54) DISTRIBUTED EAP-TLS AUTHENTICATION FOR WIRELESS NETWORKS WITH CONCEALED USER IDENTITIES

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 112 days.

(21) Appl. No.: 17/606,732

(22) PCT Filed: Apr. 29, 2020

(86) PCT No.: PCT/US2020/030424
§ 371 (c)(1),
(2) Date: Oct. 26, 2021

(87) PCT Pub. No.: WO2020/223319
PCT Pub. Date: Nov. 5, 2020

(65) Prior Publication Data
US 2022/0248221 A1  Aug. 4, 2022

Related U.S. Application Data

(60) Provisional application No. 62/841,435, filed on May 1, 2019.

(51) Int. Cl.
| | |
|---|---|
| *H04W 12/0431* | (2021.01) |
| *H04W 12/069* | (2021.01) |
| *H04W 12/03* | (2021.01) |
| *H04W 12/041* | (2021.01) |
| *H04W 12/02* | (2009.01) |

(52) U.S. Cl.
CPC ....... *H04W 12/0431* (2021.01); *H04W 12/02* (2013.01); *H04W 12/03* (2021.01); *H04W 12/041* (2021.01); *H04W 12/069* (2021.01)

(58) Field of Classification Search
None
See application file for complete search history.

(56) References Cited

U.S. PATENT DOCUMENTS

| | | |
|---|---|---|
| 7,774,411 B2 | 8/2010 | LeMay et al. |
| 8,601,569 B2 | 12/2013 | Segre et al. |

(Continued)

FOREIGN PATENT DOCUMENTS

| | | |
|---|---|---|
| WO | 2018208228 | 11/2018 |
| WO | 2019020439 | 1/2019 |

OTHER PUBLICATIONS

No stated author; 3rd Generation Partnership Project—Study on the security aspects of the next generation system (release 14); 2017; retrieved from the Internet https://portal.3gpp.org/d; pp. 1-605, as printed. (Year: 2017).*

(Continued)

*Primary Examiner* — Michael W Chao
(74) *Attorney, Agent, or Firm* — GrowIP Law Group LLC

(57) ABSTRACT

A device, mobile operator, network, and a device controller can exchange messages for EAP-TLS authentication. The network can include an authentication server function (AUSF). A device and device controller can record both a device certificate and a device controller certificate. The device controller can receive a subscriber concealed identity (SUCI) for the device from the AUSF. The device controller can decrypt the SUCI and send the network the certificates with a device SUPI. The network can send at least a TLS ephemeral public key to the device controller. The device controller can generate a digital signature for at least the ephemeral public key with a private key for the device controller certificate. The AUSF can complete an EAP-TLS authentication with the device using at least (i) the device certificate for the device, (ii) the device controller certificate for the server, (iii) the digital signature, and (iv) the ephemeral public key.

28 Claims, 3 Drawing Sheets

(56) References Cited

U.S. PATENT DOCUMENTS

| | | | | |
|---|---|---|---|---|
| 9,027,085 B2* | 5/2015 | Kula | ............... | H04L 9/3228 |
| | | | | 726/4 |
| 9,648,019 B2 | 5/2017 | Khello et al. | | |
| 10,716,002 B2 | 7/2020 | Rajadurai et al. | | |
| 2019/0098502 A1* | 3/2019 | Torvinen | ............... | H04L 9/3242 |
| 2020/0154264 A1* | 5/2020 | Kwok | ............... | H04W 60/00 |
| 2020/0213848 A1* | 7/2020 | Wan | ............... | H04L 9/3226 |
| 2020/0236536 A1* | 7/2020 | Aono | ............... | H04L 9/0866 |
| 2020/0344678 A1* | 10/2020 | Kunz | ............... | H04W 48/18 |
| 2021/0368345 A1* | 11/2021 | Nakarmi | ............... | H04W 12/06 |

OTHER PUBLICATIONS

Badra M. Key-Exchange Authentication Using Shared Secrets. Computer, 39(3) [online]. Mar. 2006 [retrieved Apr. 7, 2020]. Retrieved from <https ://www .research gate .net/publication/295 6506 _Key- Exchange _Authentication_ U sing_Shared_Secrets >.

Internet Engineering Task Force (IETF) Request for Comments (RFC) 5216, "The EAP-TLS Authentication Protocol", Mar. 2008.

ETSI Technical Standard 133 501 v.15.1.0, "5G; Security architecture and procedures for 5G System", Jul. 2018.

Internet Engineering Task Force (IETF) Request for Comments (RFC) 7542, "The Network Access Identifier", May 2015.

Internet Engineering Task Force (IETF) Request for Comments (RFC) 8446, "The Transport Layer Security (TLS) Protocol Version 1.3", Aug. 2018.

Wikipedia, "Post-Quantum Cryptography Standardization", Feb. 22, 2019.

Wikipedia, "Certificate Signing Request", May 1, 2019.

Federal Institute of Industrial Property, Russia, "Written Opinion of the International Searching Authority" for WO2020223319, dated Apr. 9, 2020.

* cited by examiner

Figure 3

Device Database 104d

| Device | NAI User Name | Device ID/ SUPI 101a | Device Certificate 101c | Provider ID 104a | Provider Certificate 104c | Provider Secret Key 104e | ECIES Secret Key 104b | ECIES Parameters 101f |
|---|---|---|---|---|---|---|---|---|
| 1 | user-1 | 101a-1 | 101c-1 | 104a-1 | 104k-1 | 104e-1 | 104b-1 | 101f-1 |
| 2 | user-2 | 101a-2 | 101c-2 | 104a-1 | 104k-1 | 104e-1 | 104b-1 | 101f-1 |
| 3 | user-3 | 101a-3 | 101c-3 | 104a-1 | 104k-2 | 104e-2 | 104b-1 | 101f-1 |
| 4 | user-4 | 101a-4 | 101c-4 | 104a-2 | 104k-2 | 104e-2 | 104b-2 | 101f-2 |
| 5 | user-5 | 101a-5 | 101c-5 | 104a-2 | 104k-3 | 104e-3 | 104b-2 | 101f-2 |
| 6 | user-6 | 101a-6 | 101c-6 | 104a-2 | 104k-3 | 104e-3 | 104b-2 | 101f-2 |

Network Database 103d

| Device ID/ SUCI 101b | Device ID/ SUPI 101a | Device Certificate 101c | Provider Certificate 104c | TLS Server Ephemeral SK 103q | TLS Device Ephemeral PK 101n | Shared Secret 225a | Symmetric key 225b | EMSK 236b | Anchor Key 236a |
|---|---|---|---|---|---|---|---|---|---|
| 101b-1 | 101a-1 | 101c-1 | 104c-1 | 103q-1 | 101n-1 | 225a-1 | 225b-1 | 206b-1 | 206a-1 |
| 101b-2 | 101a-2 | 101c-2 | 104c-1 | 103q-2 | 101n-2 | 225a-2 | 225b-2 | 206b-2 | 206a-2 |
| 101b-3 | 101a-3 | 101c-3 | 104c-2 | 103q-3 | 101n-3 | 225a-3 | 225b-3 | 206b-3 | 206a-3 |
| 101b-4 | 101a-4 | 101c-4 | 104c-2 | 103q-4 | 101n-4 | 225a-4 | 225b-4 | 206b-4 | 206a-4 |
| 101b-5 | 101a-5 | 101c-5 | 104c-3 | 103q-5 | 101n-5 | 225a-5 | 225b-5 | 206b-5 | 206a-5 |
| 101b-6 | 101a-6 | 101c-6 | 104c-3 | 103q-6 | 101n-6 | 225a-6 | 225b-6 | 206b-6 | 206a-6 |

…

DISTRIBUTED EAP-TLS AUTHENTICATION FOR WIRELESS NETWORKS WITH CONCEALED USER IDENTITIES

CROSS-REFERENCE TO RELATED APPLICATIONS

This application is a U.S. National Stage Application of International Application No. PCT/US2020/030424, filed Apr. 29, 2020, that claims the benefit of U.S. Provisional Application No. 62/841,435, filed on May 1, 2019, which are hereby incorporated herein by reference in their entirety.

BACKGROUND

Technical Field

The present systems and methods relate to conducting an extensible authentication protocol-transport layer security (EAP-TLS) authentication with concealed subscriber identities for wireless networks, and more particularly to storing and using keys and certificates with a device, a network, and a device provider in order to improve efficiency, increase flexibility, and enhance security of the EAP-TLS authentication.

Description of Related Art

The use of EAP-TLS authentication has been widely adopted over the past decade within enterprise wireless networks using WiFi standards such as 802.11. Standards for EAP-TLS authentication include the Internet Engineering Task Force (IETF) Request for Comments (RFC) 5216 titled "The EAP-TLS Authentication Protocol", which is herein incorporated by reference in its entirety. Over the past two years, the European Technical Standards Institute (ETSI) has begun publishing standards for 5' generation (5G) wireless wide-area networks (WAN), such as described in TS 133 501 V15.1.0 titled "5G; Security architecture and procedures for 5G System", which is herein incorporated by reference in its entirety. Unlike prior $4^{th}$ generation wireless WAN networks, 5G standard networks can include the support of authentication of devices using EAP-TLS, as described in Annex B of TS 133 501. EAP-TLS authentication enables the use of certificates for mutual authentication of a device and a wireless network. Previous wireless WAN standards for authentication such as with 4G LTE, 3G, etc. have depended on a pre-shared secret key recorded in a device and a secure server within the network to conduct an authentication and key agreement (AKA) protocol. The significant changes with 5G networks removes some previous limitations, but also creates additional needs in the art in order to efficiently support EAP-TLS authentication for thousands or more different types of devices connecting with hundreds or more different wireless networks globally.

The inclusion of support for EAP-TLS in 5G networks can ease the support for wireless device authentication and secure connectivity for many applications, where a pre-shared secret key such as a key K within a subscriber identity module (SIM) or embedded SIM may no longer be required. Most commercial arrangements for device owners or device users bind the use of the pre-shared secret key K within a device to a particular home wireless network that also records and derives keys from the same pre-shared secret key. 5G networks also include the use of subscribed concealed identities as a partially encrypted form of a subscriber permanent identity. 5G networks as specified in TS 133 501 also include the use of a network access identifier (NAI) according to IETF RFC 7542 titled "The Network Access Identifier", which is herein incorporated by reference in its entirety. In addition, in 2018 the IETF updated TLS version 1.2 to TLS version 1.3 in IETF RFC 8446 titled "The Transport Layer Security (TLS) Protocol Version 1.3", which is herein incorporated by reference in its entirety. ETSI published standards as of May 2019 such as TS 133 501 for 5G networks do not address the use of TLS version 1.3 with EAP-TLS authentication. A need exists in the art for devices, wireless networks, networks, and device providers to support an EAP-TLS authentication using TLS version 1.3 with the encrypted or partially encrypted subscriber concealed identities as described in TS 133 501 Annex B, where the corresponding subscriber permanent identities can use the NAI format.

Although the use of PKI certificates and private keys for EAP-TLS authentication can avoid the logistical and provisioning complexities of using a pre-shared secret key for authentication (such as with 4G and 5G AKA authentication), the use of EAP-TLS authentication can create a new series of problems or needs in the art for the many different devices and wireless networks which use EAP-TLS authentication. These problems may be avoided or more easily addressed for existing implementations of EAP-TLS authentication with corporate or enterprise WiFi networks, for example, because the enterprise can control both the device and the wireless network. The enterprise can ensure (i) a root certificate or certificate issuer certificate stored in the wireless network can be used to authenticate the device and (ii) and a root certificate or certificate issuer certificate stored in the device can be used to authenticate the wireless network. Both (i) and (ii) in the previous sentence are often required for mutual authentication using EAP-TLS standards. In addition, TLS authentication and PKI certificates and secret keys can support many different sets of cryptographic algorithms and cryptographic parameters. An enterprise deploying EAP-TLS authentication currently can control the device certificates and the wireless network certificates before device deployment and installation to ensure the PKI certificates support compatible sets of cryptographic parameters and algorithms.

However, for widespread and even global deployments of 5G networks and devices, there can be hundreds or more different device manufacturers, device providers, and wireless networks, where each could use many different cryptographic algorithms, parameters, and/or certificate issuers. In addition, (A) the device manufacturers or device providers storing device default PKI certificates in devices using device default cryptographic algorithms and cryptographic parameters may not support (B) the network PKI certificates and network supported cryptographic algorithms and cryptographic parameters. For many applications, no pre-existing relationship may exist between a device manufacturer and a wireless network before device distribution to end users and the device's first connection to a 5G wireless network. A device, using EAP-TLS authentication and a subscriber concealed identity, may not record a certificate chain or root certificate that can be used to authenticate a network certificate received from the network in a TLS handshake for EAP-TLS authentication. A need exists in the art for a wireless network to support EAP-TLS authentication for any one of hundreds or more of different devices types using concealed identities from hundreds or more different device providers. A need exists in the art, where the device uses a subscriber concealed identity, to support verification of a certificate received from any one of hundreds or more different wireless networks, where no preexisting relationship may exist between the device owner and the wireless network.

For example with the hundreds or more different 5G wireless networks globally and with a manufactured or installed set of certificate issuer certificates or root certificates, a device could receive a server certificate from an authentication server function (AUSF) that does not chain or may not be able to be verified through a root certificate or certificate issuer certificate recorded by the device. In addition, the server certificate may use cryptographic algorithms and parameters that are different than those used by a certificate issuer certificate stored within the device. The device may not have access to an IP network without first authenticating with a wireless network. This potentially creates significant problems, where the device does not have access to the IP network to receive (i) a supporting certificate for verifying the server certificate from (ii) a server other than through the wireless network where a connection is attempted. In other words, the supporting certificate may be required in order to verify the server certificate received from the wireless network, but the device may not be able to receive the supporting certificate from an IP network without first successfully completing an EAP-TLS authentication.

Similarly, (i) the wireless network may control or establish a first certificate chain for a server certificate used by an authentication server function (AUSF), (ii) a device provider may control or establish a second certificate chain within a device before distribution to and end user for verifying the server certificate, and (iii) the server certificate from a wireless network may not be verifiable by the second certificate chain. The problem of (iii) is compounded by the thousands or more potential combinations of different certificate issuer certificates and supported cryptographic parameters for required certificates to successfully complete an EAP-TLS authentication. A need exists in the art for ensuring a device can authenticate a server certificate from a wireless network using both (i) a certificate issuer certificate recorded in the device before distribution, and (ii) cryptographic algorithms and parameters recorded in the device before distribution that would support verification of the server certificate. A need exists in the art for a device to support EAP-TLS mutual authentication, without requiring a device user to load a server certificate or supporting certificate issuer certificate in order for the device to conduct mutual authentication with a wireless network. A need exists in the art for a device to record compatible cryptographic algorithms and cryptographic parameters for a server certificate without requiring a device user to load compatible cryptographic algorithms and cryptographic parameters that can be required in order for the device to use or verify the server certificate.

Without access to an IP network (such as after successfully completing EAP-TLS authentication with the wireless network), the device may not be able to request a server certificate that can be verifiable through an installed certificate chain in a device, and consequently mutual authentication using methods such as EAP-TLS may fail or require manual intervention or unnecessary interaction with a device user in order for the EAP-TLS authentication to succeed. Again, the above problems related to server certificate verification by a device and the use of different cryptographic algorithms and parameters for different server certificates received by a device is compounded by the fact that there could globally be hundreds of mobile network operators an thousands or more device providers.

A device provider may not know which of the hundreds of different mobile networks a particular device may try to connect with until the device is turned on by a user or first attempts to connect with a mobile network in a particular geographical region. Even if a particular geographical region is known, such as the United States, before a device attempts to connect to one of a handful of wireless networks, the preferred wireless network may not be known to a device provider before a device attempts to connect. A need exists in the art for a device to receive a server certificate in a TLS handshake from a wireless network supporting EAP-TLS, where verification of the server certificate does not require intervention from an end user, in order to allow a device to mutually authenticate with EAP-TLS using a subscriber concealed identity with a plurality of different mobile network operators.

In addition, a device provider may control or establish a certificate chain for verifying a device certificate stored within a device, and (ii) an authentication server function may record a set of certificate issuer certificates and/or root certificates with cryptographic algorithms and cryptographic parameters that may not support the verification of the device certificate. Devices from hundreds or more different device providers can also use different certificate chains for the device certificates and also different sets of cryptographic algorithms and cryptographic parameters. The request by the authentication server function for supporting certificate issuer certificates and/or cryptographic algorithms and cryptographic parameters for a received device certificate may take additional time, complexity, and potential security issues for securely receiving a supporting certificate issuer certificate and/or cryptographic algorithms and cryptographic parameters in order to properly verify a received device certificate. A need exists in the art for ensuring an authentication server function can securely and efficiently authenticate a device certificate received through a wireless network, where the device can utilize a subscriber concealed identity.

Many other examples exist as well for needs in the art for devices to securely and efficiently conduct EAP-TLS authentication with wireless networks, where the device uses a subscriber concealed identity, and the above are examples are just a few and intended to be illustrative instead of limiting.

SUMMARY

Methods and systems are provided for a device, a mobile network operator (MNO), a network, and a device provider to support EAP-TLS authentication, where the device can use a subscriber concealed identity. A system can include a plurality of devices, a mobile network operator, a network, and a device provider. The device can record a subscriber permanent identifier (SUPI), a device certificate, a device private key corresponding to the device public key in the certificate, an elliptic curve integrated encryption scheme (ECIES) function, a static provider public key for the ECIES function, MNO parameters, a device provider certificate, and cryptographic algorithms and cryptographic parameters used with both the device provider certificate and the device certificate. The subscriber permanent identifier can comprise a network access identifier (NAI) supporting IETF RFC 7542, where the NAI can include a user name and a realm. The realm can comprise a first portion with a provider identity and a second portion with a network identity.

The device can be a computing device for connecting with wireless networks such as a 5G network or a Wi-Fi network and the device can include a radio. The device can include a processor, memory, a user interface, and a bus connecting the components within an enclosure. The device could comprise a radio module within a larger device, such as a radio module within an automobile, industrial equipment, a mobile handset such as a smart phone, and other possibilities exist as well for physical embodiments of the device. The device can conduct an EAP-TLS authentication through the MNO with the network.

The mobile network operator can comprise a wireless network with geographically distributed radios and antennas in order to wirelessly connect with the plurality of devices. The MNO can include a MNO identity in order to uniquely identify the MNO, such as including a mobile country code and a mobile network code. The MNO can receive messages from the device through a wireless network and forward the messages to the network. The MNO can receive messages from the network and forward the messages to the device through the wireless network. The MNO can establish a secure session through an IP network with the network.

The network can include a plurality of servers operating in a coordinate manner to support communications with a device. The plurality of servers for the network can comprise a server system. The network can include an authentication server function (AUSF) and a network database. The network can include an identity comprising the network identity in the second portion of a realm for the device subscriber permanent identifier. The network can conduct an EAP-TLS authentication with the device through the MNO supporting 5G standard such as TS 133 501 V15.1.0. The network can establish a secure session with a device provider. The network can operate a network database for storing data associated with each of the plurality of different devices connecting with the network through the MNO.

The device provider can comprise a collection of servers for an entity that controls the device before the device connects with the MNO. The device provider can represent a device manufacturer, a device distributor, or a device owner for a plurality of different devices. As contemplated herein, a device provider may also be referred to as a device controller, where the device controller can control the device after it has been distributed to end users or installed in locations remote from servers associated with the device provider or device controller. The device provider can include an identity comprising the provider identity in the first portion of a realm for the device subscriber permanent identifier. The device provider can operate a device database storing data for the plurality of devices. The device provider can record the subscriber permanent identifier, a device certificate for the device, an elliptic curve integrated encryption scheme (ECIES) function for decryption of a subscriber concealed identity (SUCI), a static provider private key for the ECIES function, a device provider certificate, a device provider private key for the public key in the device provider certificate, and cryptographic algorithms and cryptographic parameters used with at least the device provider certificate. As contemplated herein, a "device provider certificate" may be referred to as a "device controller certificate", and a "device provider private key" may be referred to as a "device controller private key".

The device can generate the subscriber concealed identity (SUCI) using at least the SUPI and the ECIES encryption function. The device can use the MNO parameters to establish a radio resource connection with the MNO. The device can send the SUCI to the MNO, and the MNO can use the plaintext second portion of the realm to select the network and send the SUCI to the network. The network can use the plaintext first portion of the realm to select the device provider and send the SUCI to the device provider. The device provider can use at least the ECIES function and the static provider private key for the ECIES function to decrypt the SUCI and read the SUPI. The device provider can use the SUPI to select a device provider certificate and a device certificate for the device from the device database. The device provider can send at least the device provider certificate and the device certificate to the network, along with the SUCI. The network can store the received device provider certificate and the device certificate along with the SUCI in the network database.

The network can send an EAP-TLS start command to the device through the MNO. The network can receive a "client hello" and the SUCI from the MNO, where the "client hello" can support TLS version 1.3 as specified in RFC 8446. The "client hello" can include an ephemeral elliptic curve cryptography (ECC) public key for the device, where the device stores the corresponding device ephemeral private key. The AUSF can generate a server ephemeral PKI key pair compatible with the received ECC public key from the device in the "client hello" message, including a server ephemeral public key. The network can store the PKI keys in the network database. The network can use the SUCI to select the device provider certificate received from the device provider in the paragraph above as a server certificate for conducting the TLS version 1.3 handshake. The network can use the SUCI received with the "client hello" to select the device provider certificate from the network database. The network can process a "server hello" using at least the selected device provider certificate. Data processed by the AUSF for a "server hello" can include standard data such as the server ephemeral public key, selected extensions, a certificate request, and the selected device provider certificate. The data processed in the previous sentence can be sent in a "message to sign" request to the device provider from the network. The device provider can use the device provider secret key (which can correspond to the device provider public key in the device provider certificate) to digitally sign the message to sign using a digital signature algorithm and parameters specified in the device provider certificate. The resulting digital signature can comprise a "CertificateVerify" portion of a "server hello" message. The device provider can send the resulting digital signature to the network.

The network can generate a shared secret and a symmetric ciphering key using the device ephemeral public key received in the "client hello" and the derived server ephemeral private key with an elliptic curve Diffie-Hellman (ECDH) key exchange. The network can store the derived shared secret and the symmetric ciphering key with the SUCI for the device in the network database. The server can encrypt at least the selected extensions, a certificate request, and the selected device provider certificate and the "CertificateVerify" into a ciphertext using the derived symmetric ciphering key. The network can send the device a "server hello" message with the server ephemeral public key and the ciphertext through the MNO, where the message to the MNO can include the SUCI so that the MNO can route the message to the device.

The device can receive the "server hello" message and take steps to process the message. The device can generate the shared secret and the symmetric ciphering key using the server ephemeral public key received in the "server hello" and the derived device ephemeral private key using the ECDH key exchange. The device can decrypt the ciphertext using the symmetric ciphering key. The device can read the plaintext value for the device provider certificate. The device can verify that the received device provider certificate is the same as the device provider certificate recorded by the device before the device connected with the MNO. In this manner, the device provider certificate as used by the AUSF and MNO can be trusted without requiring the device to verify the received device provider certificate through a stored certificate issuer certificate. If the received device provider certificate is not the same as a recorded device provider certificate, then the device could verify the received device provider certificate through a certificate issuer chain stored within the device.

In other words, the device does not need Internet connectivity in order to verify the received device provider certificate as a server certificate in the "server hello" message because the device provider certificate can be verified with data previously stored inside the device before connecting with the MNO. The selection of the received device provider certificate above by the device provider (by sending the device provider certificate to the network) can ensure the device provider certificate can be verified by the device without the device needing connectivity to an IP network (in order to query for other intermediate verifying certificates), thereby solving some needs in the art identified above.

The device can also verify the "CertificateVerify" digital signature portion of the decrypted "server hello" ciphertext using the public key with the received device provider certificate. In this manner, the device can trust that the AUSF has access to the device provider secret key corresponding to the public key in the device provider certificate (although the device provider and not the AUSF may store and operate with the device provider secret key). Verification of the "CertificateVerify" digital signature can comprise an authentication of the network and/or MNO with the device.

The device can use the device provider certificate and the user portion of the SUPI to select a device certificate stored in the device. For example, the device could record multiple device certificates and select a device certificate compatible with the cryptographic parameters and algorithms within the device provider certificate. Or the device could select the device certificate based on the extensions within the decrypted ciphertext within the "server hello" message. The device can generate a response to the "server hello", where the response includes the selected device certificate and a digital signature or "CertificateVerify" from the device. The device could generate the "CertificateVerify" using the device private key corresponding to the device public key in the device certificate selected by the device. The device can encrypt the response using at least the mutually derived shared secret and data from the "client hello" and "server hello" messages. The device can send the encrypted data in the response to the MNO. The MNO can forward the response with the SUCI to the network.

The network/AUSF can use the SUCI received with the encrypted response to select the mutually derived shared secret and/or the symmetric ciphering key from the network database. The network/AUSF can decrypt the encrypted response from the device using at least the mutually derived shared secret to read the plaintext values of the device certificate and the digital signature for the device "CertificateVerify". The AUSF can compare (i) the received device certificate from the device with (ii) the device certificate stored in the network database, where the stored device certificate in the network database could be received previously as described above from the device provider. If (i) the received device certificate from the device and (ii) the received device certificate from the device provider are the same, then the device certificate can be trusted or considered verified. Or, if the device certificate received from the device is not the same as the device certificate received from the device provider, then the AUSF can conduct a certificate verification for the device certificate received from the device through a chain of certificate issuer certificates. The AUSF can verify the device "CertificateVerify" in the response by generating the equivalent of a digital signature or a hash value using the device public key from the device certificate, and if the received digital signature is equal to or the same as the generated digital signature, then the device can be considered authenticated with the network.

The AUSF can use (i) the shared secret key from the TLS ECDH key exchange stored in the network database for the device and (ii) the plaintext data from the "client hello" and the "server hello" in order to generate a TLS master secret according to the steps in IETF RFC 8446, such as section 7.1 for the key schedule. The AUSF can use the generated or derived TLS master secret to generate at least a value for an extended master secret key (EMSK) as specified in EAP-TLS standards, such as inputting the TLS master secret into a key derivation function that could include a secure hash algorithm. The AUSF can use a portion of the EMSK, such as the leading 256 bits from an EMSK as an anchor key or Kausf. The AUSF can send the anchor key along with the SUPI for the device to the MNO. The MNO can use the anchor key to derive subsequent keys required for secure wireless communications with the device.

The device can conduct the equivalent steps of using the shared secret key and the plaintext data from the "client hello" and the "server hello" in order to generate the TLS master secret according to the steps in IETF RFC 8446. The device can use the generated or derived TLS master secret to generate at least a value for EMSK as specified in EAP-TLS standards, such as inputting the TLS master secret into a key derivation function that could include a secure hash algorithm. The device can use a portion of the EMSK, such as the leading 256 bits from an EMSK as an anchor key or Kausf. The device can use the anchor key to derive subsequent keys required for secure wireless communications with the mobile network operator.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 3 is an illustration of a device database and a network database with exemplary data stored, in accordance with exemplary embodiments.

DETAILED DESCRIPTION OF EXEMPLARY EMBODIMENTS

FIG. 1

Figure 1:
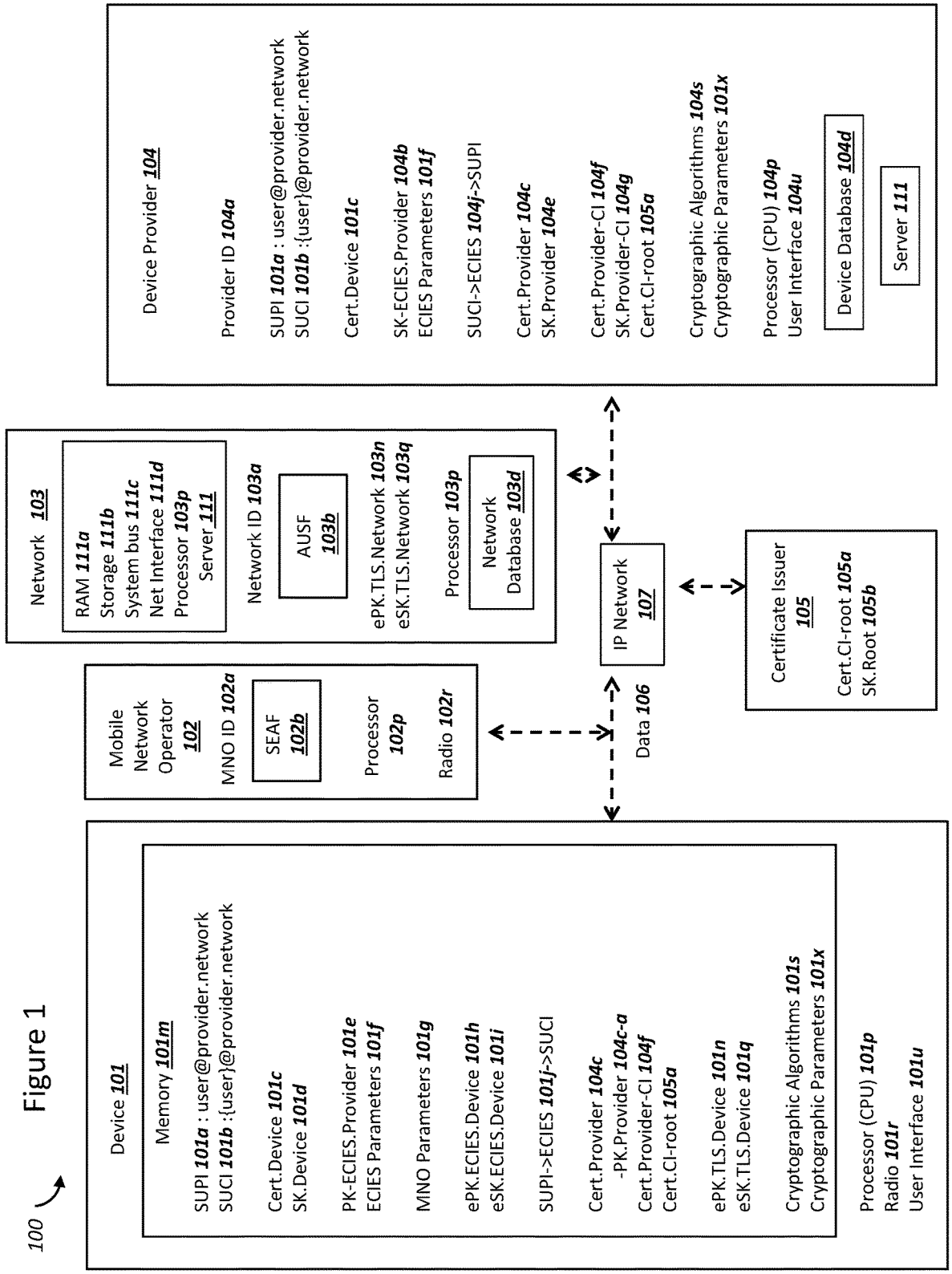
FIG. 1 is a graphical illustration of an exemplary system, where a device communicates data with a mobile network operator and a network in order to mutually authenticate with the network, in accordance with exemplary embodiments.

FIG. 1 is a graphical illustration of an exemplary system, where a device communicates data with a mobile network operator and a network in order to mutually authenticate with the network, in accordance with exemplary embodiments. The system 100 can include a device 101, a mobile network operator 102, a network 103, a device provider 104, and a certificate issuer 105. The depicted nodes or entities can communicate data 106 over an Internet Protocol (IP) network 107. Although a single device 101, a single mobile network operator 102, a single network 103, a single device provider 104, and a single certificate issuer 105 are depicted in FIG. 1, a system 100 can comprise a plurality of each of the depicted nodes or entities. A system 100 as depicted in FIG. 1 can support EAP-TLS authentication for 5G wireless WAN networks, such as supporting EAP-TLS authentication as described in Annex B of TS 133 501 V15.1.0, although other wireless networking technology for device 101 and MNO 102 could be supported as well.

Device 101 and mobile network operator 102 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, and 5G or subsequent wireless technologies. In addition, the wireless technology used by device 101 and mobile network operator 102 could support or implement wireless LAN technologies such as WiFi and the related series of standards from IEEE 802.11 standards, such as 802.11ac, 802.11 ax, etc. Other examples exist as well for wireless WAN technology and/or wireless LAN technology used by device 101 and mobile network operator 102 without departing from the scope of the present disclosure.

Mobile network operator 102, network 103, and device provider 104 can connect to the IP network 107 and communicate with each other via a wired connection such as, but not limited to, an Ethernet connection, or a fiber optic connection. In other words, mobile network operator 102 can connect to (i) device 101 through wireless technology and (ii) a network 103, a device provider 104, and a certificate issuer 105 using wired technology. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for IP Network 107 and a private network between mobile network operator 102, network 103, and device provider 104 exist as well without departing from the scope of the disclosure.

Mobile network operator (MNO) 102 can include a plurality of radio-frequency (RF) access technologies (RAT) systems for supporting wireless communications with a plurality of devices 101 in a networked manner, including through the use of geographically dispersed antennas, radio nodes, or towers. The RAT systems for MNO 102 can include a radio 102r for communicating with device 101, where radio 102r includes an antenna system and can operate through licensed radio spectrum. In exemplary embodiments, MNO 102 can operate a plurality of radios 102r which are connected to an IP network 107 in a secure manner, including connecting via a private IP network.

In exemplary embodiments, mobile network operator 102 can comprise traditional public land mobile networks providing data and voice services such as AT&T, Verizon, T-Mobile, Sprint, etc, and provide data communications services through a variety of radio access technologies. Further, although FIG. 1 depicts an MNO 102 as communicating with device 101 with a radio 102r, another entity besides a mobile network operator could perform the function of MNO 102. For embodiments where radio 101r for device 101 uses WiFi technology, then MNO 102 could comprise an entity other than a PLMN, such as a service or network that operates a plurality of WiFi access points. The function of MNO 102 could also be conducted by a large enterprise with a collection of geographically distributed WiFi access points.

Each of mobile network operator (MNO) 102, network 103, and device provider 104 could operate a plurality of servers in order to support the communications and connectivity depicted in FIG. 1 and also FIG. 2 below. The exemplary data structures, values or numbers, and steps for a MNO 102, network 103, and device provider 104 depicted in FIG. 1 and also FIG. 2 below could be recorded and/or conducted by a collection of servers for each entity. Exemplary servers for a mobile network operator 102, network 103, or device provider 104 in system 100 can be either different physical computers such as rack-mounted servers, or different logical or virtual servers or instances operating in a "cloud" configuration.

An exemplary server or collection of servers for MNO 102 can comprise a Security Anchor Function (SEAF) 102b, where a MNO 102 can include at least one SEAF 102b for establishing secure and authenticated communications with device 101 through at least one radio 102r. The SEAF 102b could comprise and operate according to the European Technical Standards Institute (ETSI) standard TS 133 501 V15.1.0 from July of 2018 and titled "5G; Security architecture and procedures for 5G System", which is hereby incorporated by reference in its entirety. In exemplary embodiments, the SEAF 102b for MNO 102 can receive an anchor key from network 103 in order to establish secure and authenticated communication with device 101, such as depicted and described for a message 237 below in FIG. 2. In exemplary embodiments where Extensible Authentication Protocol-Transport Layer Security (EAP-TLS) in a system 100, then SEAF 102b could operate as specified in section 6.1.1.2 of TS 133 501 V15.1.0, where "the SEAF takes the role of pass-through authenticator."

Note that MNO 102 could use other wireless networking technologies besides 5G. Thus, although an SEAF 102b is depicted in FIG. 1, a different collection of servers or an entity besides a SEAF 102b could perform the steps for a MNO 102 depicted in FIG. 2 below, without departing from the scope of the present invention. In general, the function of an SEAF 102b as depicted and described in connection with FIG. 2 below could be conducted by at least one server or process operating within a cloud computing environment, where the server or process may not be an SEAF 102b. For example, the server or process operating with equivalent functionality as an SEAF 102b in FIG. 2 below could (i) receive a partially encrypted Network Access Identifier (NAI) such as a SUCI 101b from device 101 with an encrypted user name and a plaintext realm for the NAI, and (ii) use the plaintext realm to forward the SUCI 101b to network 103, where network 103 uses or is associated with at least a portion of the plaintext realm.

MNO 102 can include a MNO identity 102a, where MNO identity 102a can comprise the combination of a mobile country code and a mobile network code, according to 3GPP standards for 4G networks, 5G networks, etc. As one example, MNO identity 102a for an example network of AT&T could comprise an MCC number of 310 and a MNC number of 410, such that the MNO identity 102a can be 310410. Note that a MNO 102 can operate with multiple MNO identities 102a, and a MNO identity 102a could also comprise a Domain Name Service (DNS) name such as an exemplary value of "att.net", and other possibilities exist for a MNO identity 102a without departing from the scope of the present invention. In addition, a MNO 102 could operate with a plurality of MNO identities 102a.

MNO 102 can include a plurality of processors 102p in order to store and record data as well as communicate within a system 100 over an IP network 107 and a radio 102r. Processor 102p can comprise a general purpose processor appropriate for the computational requirements for a MNO 102, and may operate with multiple different processor cores, including field programmable gate arrays (FPGA). A processor 102p can comprise exemplary ARM® based processors or an Intel® based processor such as belonging to the XEON® family of processors, and other possibilities exist as well. Processor 102p can utilize a data bus to fetch instructions from memory or storage within a server and operate on the instruction. A processor 102p can include components such as registers, accumulators, and logic elements to add, subtract, multiply, and divide numerical values and record the results in memory. In exemplary embodiments, at least one processor 102p within MNO 102 can be used with an SEAF 102b to conduct the steps for MNO 102 and send/receive messages for MNO 102 as depicted and described in connection with FIG. 2 below. Although not depicted in FIG. 1, MNO 102 can include memory and at least one database in order to establish communications with a plurality of devices 101 through a plurality of radios 102r.

Device 101 can be a computing device for sending and receiving data using a radio 101r. Device 101 can take several different embodiments, such as a general purpose personal computer, a mobile phone or mobile handset based on the Android® or Fuchsia from Google® or the IOS operating system from Apple®, a tablet, a device with a sensor or actuator for the "Internet of Things", a module for "machine to machine" communications, a device that connects to a wireless Wide Area Network (WAN) operated by MNO 102, a router, and/or a server, and other possibilities exist as well for the embodiments of a device 101 without departing from the scope of the present invention.

The electrical components within device 101 can include a memory 101m, a processor 101p, a radio 101r, and a user interface 101u. Although not depicted in FIG. 1, a data bus or a system bus could internally electrically connect the depicted components within a device 101. Additional components to support the operation of device 101 can include a battery to store electrical power, an antenna to transmit and receive RF signals, a sensor to collect data external or internal to the device 101, such as temperature, motion, position, pressure, etc. A device 101 could also include an actuator to convert electrical signals into physical actions, such as a motor for moving components, a relay for opening or closing a circuit, etc.

Memory 101m can comprise combinations of (i) volatile random access memory and nonvolatile memory. The volatile memory can include random access memory (RAM) for relatively fast read and write operations compared to nonvolatile memory, such as SRAM or DRAM. RAM for memory 101m could also include persistent RAM or nonvolatile RAM (NVRAM), such that data in a persistent RAM memory or nonvolatile RAM is stored when power is removed. Nonvolatile memory can include storage memory such as a flash memory and record or store data when power is removed from device 101. In general, different forms and electrical components for memory 101m can be used without departing from the scope of the present disclosure. Processor 101p can comprise a central processing unit (CPU) or a "system on a chip" and be similar to a processor 102p for a MNO 102 described above, but with reduced capabilities for a device 101 compared to a processor 102p for MNO.

Device 101 may include radio 101r support radio-frequency (RF) communications with networks including a MNO 102 via standards such as GSM, UMTS, mobile WiMax, CDMA, LTE, LTE Advanced, 5G, and/or other mobile-network technologies. In a wireless configuration, the radio 101r may also provide connectivity to local networks such as 802.11 WLAN, Bluetooth, Zigbee, or an IEEE 802.15.4 network, among other possibilities. In exemplary embodiments, a radio 101r is connected to an antenna, which could be either internal to device 101 or external to device 101.

Note that device 101 may also optionally include user interface 101u which may include one or more devices for receiving inputs and/or one or more devices for conveying outputs. User interfaces are known in the art and thus user interfaces are not described in detail here. User interface 101u could comprise a touch screen if device 101 operates as a smartphone or mobile phone. Device 101 can optionally omit a user interface 101u, since no user input may be required for many M2M applications such as networked sensors, although a user interface 101u could be included with device 101. LED lights or a display of LEDs could also comprise a user interface 101u.

Device 101 can include a device identity comprising a subscriber permanent identity (SUPI) 101a. The device identity can comprise a string or number to uniquely identify device 101 with MNO 102, network 103, and device provider 104, and other nodes connected to the IP network 107. A device identity of a SUPI 101a can include a network access identifier (NAI) according to IETF RFC 7542, titled "The Network Access Identifier", which is herein incorporated by reference in its entirety. A NAI can consist of different portions, such as a user identity, and a realm. The user identity can comprise a number or a string to uniquely identify device 101 within a realm. A NAI for a SUPI 101a can have many forms, and with several examples for a NAI are included in RFC 7542. Other possibilities exist as well for a NAI as a SUPI 101a for an identity of device 101 without departing from the scope of the present invention. The use of a SUPI 101a in an NAI format as a device identity for device 101 is not required for some exemplary embodiments, and for some embodiments the SUPI 101a could be a single string with an embedded user identity and realm but without the "@" character standard for a NAI.

As depicted in FIG. 1, in exemplary embodiments, a SUPI 101a can have a user identity and a realm, where the realm can have a prefix and a suffix. The prefix and the suffix can have multiple portions or more than one portion. In general, (i) a realm suffix can include a base string of a domain name associated with a network 103 (depicted as "network" for SUPI 101a in FIG. 1), and (ii) a realm prefix can include a second string associated with a device provider 104 (depicted as "provider" for SUPI 101a). In exemplary embodiments, the realm prefix can include at least a portion of a provider identity 104a and the realm suffix can include at least a portion of a network identity 103a. Note that a realm suffix could also include data or a name for MNO 102, which could include a MNO ID 102a. Other embodiments of a SUPI 101a for a device 101 than that depicted in FIG. 1 could include exemplary values of "user@network.provider" (e.g. a prefix first portion of the realm includes a name for the network 103 and a suffix second portion of the realm includes a name for the device provider 104). In other exemplary embodiments, the realm of a SUPI 101a can comprise solely a name or identity for device provider ID 104a, and for these embodiments, MNO 102 and network 103 could have agreements and technical arrangements to route data 106 with the realm of a provider ID 104a to device provider 104.

In preferred embodiments, a device 101 with a user identity of "XXXXX" could have be associated with a device provider with the name "Company", where the company has a commercial agreement and technical agreement with a cloud service such as Amazon Web Services to operate the authentication server function (AUSF) 103b, such that devices 101 for the company (e.g. a device provider) could roam and/or be authenticated with a plurality of mobile network operators. The cloud service could have commercial and technical agreements with a plurality of mobile network operators, including MNO 102 depicted in FIG. 1. The cloud service could have an exemplary network ID 103a of aws.com. For this exemplary embodiment described in this paragraph, the SUPI 101a for device 101 could comprise an example string of "XXXXX@company.aws.com". Note that an identity of MNO 102 such as MNO ID 102a may not need to be included in SUPI 101a, and MNO 102 can select network 103 based on the suffix of the realm (e.g. aws.com). In another embodiment, the MNO 102 identity could be included in the realm, where the MNO ID 102a could be "att.com", and the SUPI 101a for device 101 could be "XXXXX@company.aws.att.com". Other possibilities exist as well without departing from the scope of the present invention.

Although not depicted in FIG. 1, a NAI as a SUPI 101a could comprise a string where realm has an identity of the network 102a in the prefix and an identity of the device provider 103a in the suffix. Or, the realm could comprise a single base string that is unique for a combination of an identity of device provider 104a and network 102a (such as a realm of "company-aws.com"). Further, in some exemplary embodiments, the realm of a NAI for SUPI 101a could omit an identity device provider 104a and consist only of an identity for network 103 of network ID 103a (where the realm could be uniquely associated with a device provider 104). Or, the realm of a NAI for SUPI 101a could omit an identity network 102a and consist only of an identity for device provider 103 of provider ID 103a. In general, the realm of a SUPI 101a can include sufficient identifying information (such as at least a portion of network ID 103a and/or provider ID 104a) in order for data within a message from device 101 to be (i) received by MNO 102 and forwarded to network 103, and (ii) received by network 103 and forwarded to device provider 104.

A device 101 can also include a subscriber concealed identity (SUCI) 101b. SUCI 101b can include an encrypted identity of a user name or user identity, depicted as "{user}" in FIG. 1 and the plaintext realm, where exemplary formats or contents of a realm were depicted and described in the two paragraphs above. A SUCI 101b can be derived from a SUPI 101a using an elliptic curve integrated encryption scheme (ECIES) 101j, which is described in addition detail below. In exemplary embodiments, device 101 communicates with a MNO 102 using a SUCI 101b as the identity for device 101 instead of the SUPI 101a, in order for the user identity of device 101 to be encrypted.

Although "user" is the term depicted in FIG. 1 and also for a NAI in RFC 7542 and related 3GPP specifications, the "user" portion of a NAI can comprise a string of digits or numbers or characters to uniquely identify device 101 for a device provider 104 and the "user" portion of a NAI within a SUPI 101a or SUCI 101b does not need to be associated with a user such as a person. In other words, a "user" within an identifier such as a NAI or a SUPI 101a can be an identity for a device. The plaintext for the realm in a SUCI 101b can be required in order for MNO 102 and/or network 103 to route data for a SUCI 101b forward (e.g. MNO 102->network 103 and network 103->device provider 104). MNO 102 could use a first plaintext prefix with network ID 103a in the realm to select a network 102. In other words, in exemplary embodiments, the realm portion of a NAI for a SUCI 101b can remain plaintext, although the "user" portion of a NAI for a SUCI 101b can be encrypted.

The "user" portion of a NAI for a SUPI 101a could comprise a medium access control (MAC) address for a physical interface such as Ethernet or WiFi, an international mobile subscriber identity (IMSI) or international mobile equipment identity (IMEI) with 2G/3G/4G networks, and other possibilities exist as well for the user portion of a NAI as a SUPI 101a without departing from the scope of the present invention. In exemplary embodiments, SUPI 101a can be written to hardware in device 101 and operate as a globally unique, long-term identity for device 101. Note that a device 101 could use several different SUPI 101a, such as a first SUPI 101a with a first network 103 and a second SUPI 101a with a second network 103, where the realm portion can be different for the first and second SUPI 101a and the different realm portions can include different network IDs 103a.

A certificate for device 101 can comprise cert.device 101c and can include the device identity comprising the SUPI 101a. For some embodiments, the device identity within a device certificate cert.device 101c can be a number, string, or value that is different than the SUPI 101a. As one example, a SUPI 101a could be for connecting with a wireless network 102, while a device identity in a cert.device 101c can be for communicating with a device provider 104. A certificate 101c for device 101 can include a device public key corresponding to the device private key SK.Device 101d, a set of cryptographic parameters for the device public key, the identity of a certificate authority, and a digital signature for the certificate authority. A certificate 101c for device 101 and other nodes in a system 100 can comprise a certificate supporting X.509 v3 formats. The cryptographic parameters can specify parameters for both the device public key and also the digital signature from a certificate authority. Cryptographic parameters in a certificate can specify algorithms such as RSA or elliptic curve cryptography (ECC) values, ECC curve names, key lengths in bits, signature algorithms, validity dates, encoding rules, etc.

The signature of the certificate authority for cert.device 101c could be included in device certificate 101c. A node of system 100 in FIG. 1, such as the authentication server function (AUSF) 103b can use the device certificate cert.device 101c in order to authenticate device 101 with MNO 102. Additional details regarding the use a certificate for device 101 of cert.device 101c will be described below in FIG. 2. Note that other nodes in a system 100 can record and operate with a certificate similar to cert.device 101c, except with identities for the nodes, the public keys for the nodes, and certificate authority digital signatures for the public keys. A device 101 could record an use multiple different device certificates 101c (possibly with different device public keys corresponding to different device private keys), where the device 101 selects the different device certificates 101c based on the MNO 102 and/or the network 103 the device 101 communicates with.

A device 101 can record and use a device private key SK.device 101d (e.g. "secret key"). The private key can correspond to the public key in the device certificate cert.device 101c. In exemplary embodiments, device 101 internally generates a random number for the device private key SK.device 101d and using cryptographic algorithms 101s and generates the device public key in a certificate 101c. The private key SK.device 101d and the corresponding public key can be for the set of cryptographic parameters within the certificate 101c, such as the values for an elliptic curve named curve. The generation of the public key for device certificate cert.device 101c could be (i) during device 101 manufacturing or distribution and (ii) before device 101 sends a SUCI 101b to a MNO 102.

In some exemplary embodiments before device 101 establishes a radio connection with MNO 102 (such as during a device configuration step), device provider 104 receives the public key for SK.device 101d and signs the public key with a device provider secret key such as SK.Provider 104e in order to generate the device certificate cert.device 101c. Or, a device certificate cert.device 101c could be signed by a different certificate issuer than a certificate issuer operated by device provider 104. Note that cryptographic algorithms 101s and PKI keys for device 101 can support post-quantum cryptography (PQC) and support code-based, lattice-based, and related cryptographic algorithms. Example possible algorithms for parameters in device certificate cert.device 101c include those described in "Post-Quantum Cryptography Standardization" from Wikipedia dated Mar. 12, 2019, which is herein incorporated by reference.

Device 101 can store or record a public key for the device provider 104 of PK-ECIES.Provider 101e in order to conduct ECIES 101j encryption of the user name for a SUCI 101b. The public key can be associated with a set of cryptographic parameters ECIES Parameters 101f for using the public key (such as an ECC curve name), and the cryptographic parameters could be used with ECIES 101j function. In other words, ECIES Parameters 101f can specify a named curve associated with PK-ECIES.Provider 101e. The device provider 104 can record a private key corresponding to PK-ECIES.Provider 101e, where the private key can comprise SK-ECIES.Provider 104b as depicted in FIG. 1. The value of PK-ECIES.Provider 101e could be written to memory 101m during manufacturing or distribution or configuration of device 101. Note that PK-ECIES.Provider 101e can comprise multiple different points on different ECC curves, such that different values of PK-ECIES.Provider 101e can be selected depending on the parameters ECIES Parameters 101f used by ECIES 101j. In other words, PK-ECIES.Provider 101e can include a first public key for name curve P-256, a second public key for named curve 25519, where the selection of the first public key or second public key could be based on ECIES Parameters 101f.

MNO parameters 101g can include a list of numbers or strings for values such as (i) allowed frequencies or frequency bands to scan, (ii) preferred access lists for roaming onto other wireless networks, (iii) criteria for a device 101 to select MNO 102, including in idle mode, (iv) support for emergency services, (v) supported languages or character encoding, (vi) codes to search for in beacons broadcast by a wireless network 102, (vii) parameters for a radio 101r to use when connecting to a wireless network 102, (viii) names or addresses for a server associated with a MNO 102 in order for a device 101 to conduct radio resource connect procedures, etc. A device 101 can record multiple sets of MNO parameters 101g for a plurality of different MNO 102, and a device 101 could select a MNO 102 from a plurality of available MNO 102 for radio 101r based on data within MNO parameters 101g.

Device 101 can derive an ephemeral public key ePK.ECIES.Device 101h and an associated secret key or private key eSK.ECIES.Device 101i, using a random number, a key pair generation function, and the set of ECIES Parameters 101f. Device 101 can utilize a random number generator similar such as hardware random number generator in order to derive the private key eSK.ECIES.Device 101i and input the random number into the key pair generation function. A key pair generation function could be included in application software running on device 101, and exemplary software for key pair generation algorithm can comprise OpenSSL, crypto++, or Mozilla libraries. The resulting ephemeral public key ePK.ECIES.Device 101h can be sent to MNO 102 in a message 205 below in FIG. 2. The resulting secret key or private key eSK.ECIES.Device 101i can be input into the encryption function ECIES 101j in order to convert a SUPI 101a into a SUCI 101b, where the user portion of an NAI for a SUPI 101a can be encrypted in a SUCI 101b. In some embodiments, the realm portion of the NAI in a SUCI 101b can remain plaintext, such that wireless network 102 can read the plaintext realm for the SUCI 101b in order to select and forward the SUCI 101b to a network 103 and/or device provider 104.

Device 101 can include an encryption function ECIES 101j in order to convert a SUPI 101a into a SUCI 101b. The encryption function ECIES 101j can comprise the identity encryption scheme as described in Annex C: "Protection schemes for concealing the subscription permanent identifier" in ETSI standard TS 33.501 version 15.1.0. In summary, device 101 can conduct an elliptic curve Diffie-Hellman key exchange using private key eSK.ECIES.Device 101i and public key PK-ECIES.Provider 101e and parameters ECIES Parameters 101f in order to generate an encryption key and a message authentication code (MAC) key. The user portion of SUPI 101a, or the user name, can be input into the encryption function ECIES 101j along with the derived encryption key and MAC key in order to generate SUCI 101b which contains the user name as a ciphertext (depicted as "{user}" in FIG. 1 and FIG. 2 below). A MAC code generated by ECIES 101j using the MAC key can be used to verify message integrity for the SUCI 101b by device provider 104. The realm portion of SUPI 101a can remain as plaintext for SUCI 101b after encryption function ECIES 101j.

Device 101 can record or store a certificate for device provider 104 comprising Cert.Provider 104c, where the certificate for device provider 104 can be similar to the certificate for device 101 described above. An identity for device provider 104 recorded with Cert.Provider 104c can comprise provider ID 104a. Cert.Provider 104c can also record a public key for device provider 104 comprising PK.Provider 104c-a. Cryptographic parameters can be included in the certificate for device provider 104, such as an ECC named curve for PK.Provider 104c-a, a time for validity of the certificate, and other information normally recorded in an X.509 v3 certificate. Note that in exemplary embodiments, the certificate Cert.Provider 104c can be associated with and generated by device provider 104 and not MNO 102 and network 103. As depicted and described below in connection with FIG. 2, exemplary embodiments contemplate that (i) device 101 can authenticate with network 103 and (ii) MNO 102 can obtain an anchor key for device 101 without device 101 receiving or storing a certificate for MNO 102 and network 103 different than the stored or recorded device provider certificate Cert.Provider 104c.

In this manner, the use of a device 101 in a system 100 can be significantly more flexible than conventional technology, since a device provider 104 can control the device 101 before connecting to MNO 102 or selecting MNO 102 and device 101 does not need to receive a separate server certificate that chains to (or can be verified through) a previously recorded root certificate Cert.CI-root 105a. In other words, without the technology described herein, an MNO 102 and network 103 operating an AUSF 103b may not readily guarantee (or without user interaction for device 101) that device 101 can verify a server certificate received from AUSF 103b that can be verified with a recorded root certificate Cert.CI-root 105a.

The certificate Cert.Provider 104c can be signed by a certificate authority such as a device provider certificate issuer, and device 101 can record a chain of certificate authority certificates up to a root certificate Cert.CI-root 105a for a certificate issuer 105. For example, as depicted in FIG. 1, device 101 Cert.Provider 104c could be signed by a certificate issuer for device provider 104 with a certificate comprising Cert.Provider-CI 104f. The public key for the device provider certificate issuer in Cert.Provider-CI 104f could be signed by the certificate issuer 105. The certificates for device provider 104 including Cert. Provider 104c and the supporting chain of certificates including Cert.Provider-CI 104f and root certificate Cert.CI-root 105a could be written by device provider 104 during distribution or configuration of device 101 or before device 101 is received by an end user of device 101. The certificates for device provider 104 including Cert.Provider 104c and the supporting chain of certificates including Cert.Provider-CI 104f and root certificate Cert.CI-root 105a could be stored by device 101 before device 101 sends data 106 to a MNO 102 in order to authenticate the device 101 with MNO 102.

For embodiments where the certificate Cert.Provider 104c is written to device 101 or stored by device 101 before a device 101 connects with a MNO 102, then a device 101 could also (i) receive Cert.Provider 104c in a message from network 103 and (ii) check that the received Cert.Provider 104c matches the stored Cert. Provider 104c, and in this manner Cert.Provider 104c could be authenticated without requiring device 101 to conduct a full set of certificate signature verification steps through parent certificates of Cert.Provider 104c up to root certificate Cert.CI-root 105a.

Note that without recording Cert.Provider 104c in memory before connecting to a MNO 102, then device 101 could receive a server/network certificate from AUSF 103b that does not chain to (or be verified through) root certificate Cert.CI-root 105a, which can cause significant problems with conventional technology. The reason is device 101 may not have access to IP network 107 without first authenticating with AUSF 103b and may have no ability to request a parent certificate from AUSF 103b that chains to (or can be verified through) root certificate Cert.CI-root 105a stored on device 101. Without (i) previously recording Cert.Provider 104c and (ii) verifying a received Cert. Provider 104c through a root certificate Cert.CI-root 105a (or some other certificate previously securely stored in device 101 before connecting with MNO 102), then device 101 may not feasibly be able to verify a received Cert.Provider 104c and thus authenticate MNO 102 and network 103.

Device 101 can derive an ephemeral public key ePK.TLS.Device 101n and an associated secret key or private key eSK.TLS.Device 101q, using a random number, a key pair generation function, and the set of cryptographic parameters for a TLS session. Device 101 can utilize a random number generator similar such as hardware random number generator in order to derive private key eSK.TLS.Device 101q and input the random number into the key pair generation function. A key pair generation function could be included in application software running on device 101, and exemplary software for key pair generation algorithm can comprise OpenSSL, crypto++, or Mozilla libraries. The resulting ephemeral public key ePK.TLS.Device 101n can be sent to MNO 102 and network 103 in a message 218 below in FIG. 2 in a TLS 1.3 "Client Hello" message.

Device 101 could use a set of cryptographic algorithms 101s in order to process and use ePK.TLS.Device 101n and eSK.TLS.Device 101q with TLS messages such as a "client hello", a "server hello", and subsequent TLS messages. Private key eSK.TLS.Device 101q and a public key for network 102 of ePK.TLS.Network 103n can be input into an ECDH key exchange algorithm within cryptographic algorithms 101sa in order to mutually derive a shared secret key. The shared secret key can be used to generate or derive a symmetric ciphering key and a MAC key. Device 101 could use the PKI keys with cryptographic algorithms 101s and cryptographic parameters 101x in order to mutually derive a symmetric ciphering key and a MAC key with network 102, as specified in IETF RFC 8446 titled "The Transport Layer Security (TLS) Protocol Version 1.3", which is herein incorporated by reference in its entirety. Note that device 101 and network 103 could also use the PKI keys to mutually derive a symmetric ciphering key and a MAC key using previous versions of TLS as well, such as TLS version 1.2.

Cryptographic algorithms 101s can include the steps and logic for processor 101p in device 101 to conduct in order for device 101 to securely communicate with MNO 102 and network 103. Cryptographic algorithms 101s can include at least symmetric ciphering algorithms, a random number generator, a key pair generation algorithm, digital signature algorithms, asymmetric ciphering algorithms, and key exchange algorithms. Cryptographic algorithms 101s can also include a key verification step for verifying that a received public key is valid for an ECC curve. Cryptographic algorithms 101s can use libraries available from example cryptographic suites such as OpenSSL, crypto++, BouncyCastle, or Mozilla, and other possibilities exist as well without departing from the scope of the present disclosure. Cryptographic algorithms 101s can use inputs of keys such as public keys, private keys, and/or symmetric keys along with cryptographic parameters 101x in order to for device 101 to process cryptographic data including ciphertext, key exchanges, and digital signatures.

Cryptographic parameters 101x can specify values or settings for (i) conducting an ECDH or ECDHE key exchange, (ii) mutually deriving a shared secret, (iii) mutually deriving a symmetric ciphering key from the shared secret, (iv) using a symmetric ciphering algorithm with the symmetric ciphering key, and (v) using a digital signature algorithm. As contemplated herein, cryptographic parameters 101x may also be referred to as parameters 101x. Each of device 101, MNO 102, and network 103 and device provider 104 can record at least one compatible subset of parameters within a set of cryptographic parameters 101x. Parameters 101x can specify values for an elliptic curve cryptography (ECC) curve name, key length, key formatting (e.g. compressed or uncompressed), encoding rules, etc.

As contemplated herein, the parameters 101x and cryptographic algorithms 101s used with ECC PKI keys and a key exchange in the present invention can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. Other possibilities exist as well for cryptographic parameters 101x without departing from the scope of the present invention.

For use of ECC algorithms, parameters 101x can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters 101x can specify domain parameters for nodes in system 100 to calculate values or numbers in a compatible manner, such as common base point G for use with ECC PKI key pairs and a defining equation for an elliptic curve.

Network 103 can comprise a collection of servers and also operate as a cloud service. As depicted for system 100 in FIG. 1, network 103 can communicate with device 101, MNO 102, and device provider 104 through IP network 107. Network 103 can include a network identity of network ID 103a, which could comprise a domain name, a name, or a string to uniquely identify network 103 in a system 100. In exemplary embodiments, at least a portion of network ID 103a is included in the realm of device identity comprising a NAI for SUPI 101a. Network 103 can include at least one server 111 as depicted in FIG. 1. Server 111 can include hardware components similar to those of a device 101 depicted in FIG. 1, except generally with larger capacities appropriate for a server 111. Server 111 can also operate as a host computing environment with physical hardware for a virtual machine to operate as a guest computing environment. In an exemplary embodiment, the AUSF 103b can comprise a virtual machine operating on server 111.

A server 111 can include random access memory (RAM) 111a, storage memory 111b, at least one system bus 111c, and at least one network interface 111d. As within a server 111 operating in a network 103, server 111 can include at least one processor 103p in order to store and record data as well as communicate with other nodes over an IP network 107, such as with MNO 102 and device provider 104 through an IP network 107. Processor 103p can also be referred to as a central processing unit (CPU) 103p. Processor 103p can comprise a general purpose processor appropriate for the computational requirements for a server 101, and may operate with multiple different processor cores, including field programmable gate arrays (FPGA).

A processor 103p can comprise exemplary ARM® based processors or an Intel® based processor such as belonging to the XEON® family of processors, and other possibilities exist as well. Processor 103p can utilize the system bus 111c to fetch instructions from RAM memory 111a or storage memory 111b within a server 111 and operate on the instruction. A processor 103p can include components such as registers, accumulators, and logic elements to add, subtract, multiply, and divide numerical values and record the results in memory. In exemplary embodiments, at least one processor 103p within server 111 can be used to conduct the steps and message flows depicted in FIG. 2 below.

RAM 111a may comprise a random access memory for Server 111. RAM 111a can be a volatile memory providing rapid read/write memory access to processor 103p. RAM 111a could be located on a separate integrated circuit in server 111. The system bus 111c may be any of several types of bus structures including a memory bus or memory controller, a peripheral bus, and a local bus using any of a variety of bus architectures including a data bus. System bus 111c connects components within server 111, such as transferring electrical signals between the components illustrated for a server 111. Server 111 can include multiple different versions of bus 111c to connect different components, including a first system bus 111c between CPU 103p and RAM 111a (which could be a memory bus), and a second system bus 111c between CPU 103p and network interface 111d, which could be a SPI bus, a PCI bus, or similar data busses.

Server 111 may also operate a network interface 111d, where network interface 111d can be used to connect and communicate with other nodes such as depicted in FIG. 1 and also FIG. 2 below. Network interface 111d can comprise a physical interface connected to system bus 111c for server 111. In exemplary embodiments, network interface 111d can comprise an Ethernet or fiber optic wired connection. Network interface 111d can connect server 111 to plurality of computing devices and other servers through networks such as the globally routable public Internet.

Nonvolatile memory 111b or "storage" 111b (which can also be referred to herein as "storage memory 111b") within server 111 can comprise a non-volatile memory for long-term storage of data, including times when server 111 may be powered off. Storage memory 111b may be a NAND flash memory or a NOR flash memory and record firmware for server 111, such as a bootloader program and an operating system. Storage memory 111b can record long-term and non-volatile storage of data or files for server 111. In exemplary embodiments, the network identity 103a is recorded in storage memory 111b when server 111 is powered off, and the network identity 103a along with a network database 103d are moved by CPU 103p into RAM 111a when server 111 powers on.

Storage memory 111b can operate as a traditional hard disk drive or a solid state drive (SSD), or as a storage area network (SAN). Storage memory 111b can also comprise a plurality of spinning hard disk drives in a redundant array of independent disks (RAID) configuration. Storage memory 111b may also be referred to as "server storage" and can include exemplary file systems of FAT16, FAT 32, NTFS, ext3, ext4, UDF, or similar file systems. As contemplated herein, the terms "memory 111b", "storage memory 111b", and "nonvolatile memory 111b" can be considered equivalent.

Network 103 can include an authentication server function AUSF 103b as specified in ETSI TS 133 501 V15.1.0, as well as subsequent or related versions of ETSI standards. In general, an authentication server function can communicate with a security anchor function SEAF 102b from MNO 102. AUSF 103b can receive a SUCI 101b for device 101 from SEAF 102b, where MNO 102 receives SUCI 101b from device 101 via a wireless network and radio 102r. Additional details for the communication and operation of AUSF 103b for network 103 is provided below in FIG. 2. In exemplary embodiments, AUSF 103b and device 101 can support EAP-TLS authentication, where EAP-TLS authentication for device 101 using a wireless network is described in Annex B of ETSI TS 133 501 V15.1.0. AUSF 103b can send and receive messages with device 101 through MNO 102 and also send and receive messages with device provider 104 through IP network 107. Network 103 can include at least one processor 103p, where processor 103p can operate in a similar manner as a processor 102p described above for MNO 102. Processor 103p could be included in a server 111 and also within AUSF 103b. A network 103 can operate with a plurality of processors 103p and/or servers 111 in order to perform the steps and communicate the messages depicted and described for a network 103 in FIG. 2 below.

Network 103 can derive an ephemeral public key ePK.TLS.Network 103n and an associated secret key or private key eSK.TLS.Network 103q, using a random number, a key pair generation function, and the set of cryptographic parameters for a TLS session. Network 103 can utilize a random number generator similar such as hardware random number generator in order to derive the private key eSK.TLS.Network 103q and input the random number into the key pair generation function. A key pair generation function could be included in application software miming in network 103. The PKI keys depicted and associated cryptographic algorithms and cryptographic parameters could be operated within AUSF 103b, where AUSF 103b operates on a server 111. The cryptographic algorithms and cryptographic parameters operated within AUSF 103b could be equivalent to cryptographic algorithms 101s and cryptographic parameters 101x used by device 101. Exemplary software for key pair generation algorithms and cryptographic algorithms equivalent to cryptographic algorithms 101s within network 103 can comprise OpenSSL, crypto++, or Mozilla libraries.

The resulting ephemeral public key ePK.TLS.Network 103n can be sent to MNO 102 and device 101 in a message 227 below in FIG. 2 in a TLS 1.3 "Server Hello" message as key share 103n. Network 103 could use a set of cryptographic algorithms in order to process and use ePK.TLS.Network 103n and eSK.TLS.Network 103q with TLS messages such as a "client hello", a "server hello", and subsequent TLS messages. Private key eSK.TLS.Network 103q and a public key for device 101 of ePK.TLS.Device 101n can be input into an ECDH key exchange algorithm in order to mutually derive a symmetric ciphering key and a MAC key. AUSF 103b could use the PKI keys with cryptographic algorithms and cryptographic parameters in order to mutually derive a shared secret key and then a symmetric ciphering key and a MAC key with device 101, as specified in IETF RFC 8446 titled "The Transport Layer Security (TLS) Protocol Version 1.3", which is herein incorporated by reference in its entirety. Note that device 101 and network 103 could also use the PKI keys to mutually derive a symmetric ciphering key and a MAC key using previous versions of TLS as well, such as TLS version 1.2.

As depicted in FIG. 1, a network 103 can also operate a network database 103d. A network database 103d could comprise a collection of servers and storage memory for storing values associated with a plurality of devices 101 in order to support the operation of a system 100. A network database 103d could store values, strings, or numbers for device 101 such as a SUCI 101b received from MNO 102 and a device provider certificate 104c for device 101 received from device provider 104, and other data could be stored in a network database 103d as well. Exemplary data for an exemplary network database 103d is depicted and describe in connection with FIG. 3 below. Data within a network database 103d could be recorded or stored as network 103 receives data for a device 101 from a MNO 102 and a device provider 104. Subsequent communications after receipt of the data could use a network database 103d in order to select stored values for communication with device 101.

Device provider 104 can comprise an entity or set of servers for authenticating or managing plurality of devices 101. Both device provider 104 and MNO 102 could operate a plurality of server 111. Although depicted in FIG. 1 and FIG. 2 as "device provider 104", an entity such as a device owner, a device manufacturer, or a device distributor could record the data and perform the functions of a "device provider 104", and the entity depicted in FIG. 1 and FIG. 2 below may also be referred to herein as "device controller 104". In general, a device provider 104 can comprise an entity or collection of servers which is the source for providing Cert.Provider 104c to device 101 before device 101 connects with MNO 102, where Cert.Provider 104c can be used by device 101 to authenticate MNO 102 and with AUSF 103b below in FIG. 2. As contemplated herein, a "device provider" may also be referred to as a "provider" or "device controller". Consequently, a device provider secret key SK.Provider 104e can be referred to as a "provider secret key 104e", a device provider certificate Cert.Provider 104c can be referred to as a "provider certificate 104c", etc. Likewise, a device provider secret key SK.Provider 104e can be referred to as a "controller secret key 104e" and a device provider certificate Cert.Provider 104c can be referred to as a "controller certificate 104c", etc.

Figure 2:
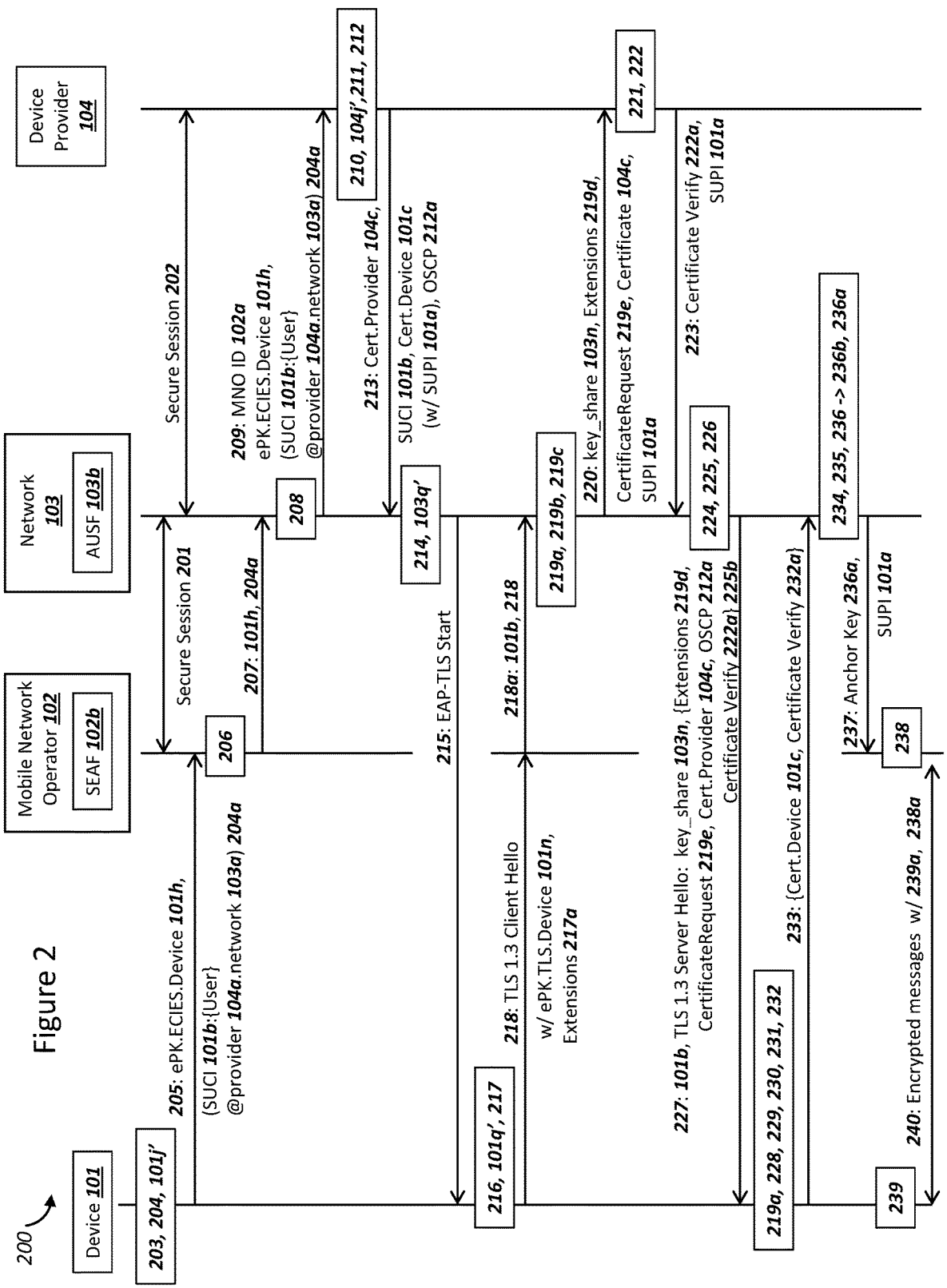
FIG. 2 is a simplified message flow diagram illustrating an exemplary system with exemplary data sent and received by a device, a mobile network operator, a network, and a device provider, in accordance with exemplary embodiments.

Although depicted as "device provider" in FIG. 1 and FIG. 2, the device provider 104 could be a device owner, a device distributor, or a device manufacturer. In general, a device provider has a sufficient level of ownership or control of device 101 before device 101 connects with MNO 102 such that device provider 104 could record or store the device identity SUPI 101a, and at least a certificate 101c for device 101 before device 101 connects with MNO 102. For some embodiments, device provider 104 could also store a device provider certificate 104c before device 101 connects with MNO 102. For some embodiments, device provider 104 could also be a device user, where the device user operates a plurality of different devices 101. As one example, device provider 104 could be a large enterprise responsible for hundreds or more devices 101 that are geographically dispersed, and the enterprise may prefer to support the authentication and networking connectivity for device 101 using the steps and messages depicted for a system 200 in FIG. 2 below.

Device provider 104 can include a provider identity of provider ID 104a. Provider ID 104a can comprise a name or unique identifier, including a domain name or at least a portion of a realm in a NAI, in order to uniquely identify device provider 104 in a system 100, since a system 100 could include a plurality of different device providers 104. At least a portion of the provider ID 104a can be included in the SUPI 101a and SUCI 101b, such as within the realm portion of the SUPI 101a and SUCI 101b, as depicted in FIG. 1. Although a single provider ID 104a is depicted in FIG. 1, a device provider could use a plurality of different related provider ID 104a names or identities, such as "company-1", "company-2", etc. The use of different provider ID 104a names is also depicted and described for in a device database 104d in FIG. 3 below.

Different devices 101 could include the different provider ID 104a names in the SUCI 101b, such as a first set of devices using an exemplary value of "company-1" in the realm portion of a SUCI 101b and a second set of devices using an exemplary value of "company-2" in the realm portion of SUIC 101b. In exemplary embodiments, the provider ID 104a in the realm portion of a SUCI 101b can be used to select from device database 104d the SK-ECIES.Provider 104b for an ECIES decryption function 104j, such that different devices 101 can use different corresponding PK-ECIES.Provider 101e for a SUPI/ECIES encryption function 101j by the different devices. The use of different provider ID 104a names and different secret keys SK-ECIES.Provider 104b for device provider 104 is also depicted for a device database 104d in FIG. 3 below.

Device provider 104 can store a plurality of device identities comprising SUPI 101a for a plurality of devices 101. Although depicted as external to device database 104d in FIG. 1, the values of SUPI 101a could be recorded within device database 104d along with the unique user name portion for each of the devices 101. Note that for a given device 101 in a system 100, a user name may not be globally unique, but the combination of user name and realm for a SUPI 101a can be globally unique in preferred embodiments. Device provider 104 can also store the concealed identity SUCI 101b received from a network 103 and originated by device 101 in order to conduct an ECIES 104j decryption step to convert the SUCI 101b into a SUPI 101a for a device 101.

Device provider 104 can also store or record a plurality of device certificates 101c corresponding to a plurality of devices in a system 100. The device provider 104 could be responsible for initial configuration of devices 101 or receive initial configuration data for devices 101, where the initial configuration of device 101 can include the generation of a device certificate 101c, and device provider 104 could store the device certificate 101c for each of the devices 101. Although depicted as external to a device database 101d, device provider 104 could store a plurality of device certificates 101c in a device database 101d. By device provider 104 storing a device certificate 101c and providing the device certificate 101c to a network 103, the authentication by network 103 of device 101 can be simplified, as described below in FIG. 2 (since network 103 could trust device provider 104 and receive the device certificate 101c from device provider 104, where network 103 may not necessarily trust device 101 when a certificate 101c is received from device 101).

Device provider 104 can store or record a secret key for the device provider 104 of SK-ECIES.Provider 104b in order to conduct ECIES 104j decryption of the user name in a received SUCI 101b. The private key can be associated with a set of cryptographic parameters ECIES Parameters 101f for using the private key (such as an ECC curve name), and the cryptographic parameters could be used with ECIES 104j decryption function. Note that a device provider 104 could use (i) a first SK-ECIES.Provider 104b with a first provider ID 104a with ECIES 104j decryption function and (ii) a second SK-ECIES.Provider 104b with a second provider ID 104a with ECIES 104j decryption function, which is also depicted within a device database 104d in FIG. 3 below.

ECIES Parameters 101f can specify a named curve associated with private key SK-ECIES.Provider 104b. As described above, the device 101 can record a public key corresponding to SK-ECIES.Provider 104b, where the public key for device 101 can comprise PK-ECIES.Provider 101e as depicted in FIG. 1. The value of PK-ECIES.Provider 101e could be generated by device provider 104 using SK-ECIES.Provider 104b and ECIES Parameters 101f. PK-ECIES.Provider 101e could provided to device 101 before device 101 sends a SUCI 101b to MNO 102, such as during device manufacturing or device distribution or device configuration. Different values of SK-ECIES.Provider 104b and corresponding ECIES Parameters 101f can be selected by device provider 104 using (i) at least a portion of provider ID 104a in a realm within a received SUCI 101b for device 101 and (ii) a device database 104d. SK-ECIES.Provider 104b can comprise a first private key for named curve P-256, a second public key for named curve 25519, where the selection of the first private key or second private key could be based on ECIES Parameters 101f, which could be associated with the provider ID 104a in a realm received in a SUCI 101b for device 101. Note that the transmission of a SUCI 101b by device 101 can also include a specified set of ECIES parameters 101f in order to identify a named curve or parameters associated with ePK.ECIES.Device 101h transmitted by device 101 along with the SUCI 101b.

Device provider 104 can include a decryption function ECIES 104j in order to convert a SUCI 101b into a SUPI 101a. The decryption function ECIES 104j can comprise the identity decryption scheme as described in Annex C: "Protection schemes for concealing the subscription permanent identifier" in ETSI standard TS 33.501 version 15.1.0. In summary, device provider can conduct an elliptic curve Diffie-Hellman key exchange using (i) private key SK-ECIES.Provider 104b, (ii) a received device public key ePK.ECIES.Device 101h received along with SUCI 101b, and (iii) parameters ECIES Parameters 101f in order to generate an encryption key and a message authentication code (MAC) key. The user portion of SUCI 101b, or the encrypted user name, can be input into the decryption function ECIES 104j along with the derived encryption key and MAC key in order to generate SUPI 101a which contains the user name as a plaintext. A MAC code generated by ECIES 104j using the MAC key can be used to verify message integrity for the SUCI 101b by device provider 104. The realm portion of SUCI 101b can be received as plaintext and may not be altered or changed by ECIES 104j. In exemplary embodiments, a MAC code output by ECIES 104j is calculated over the entire SUCI 101b, including an encrypted user name for device 101, and thus the integrity or authentication of a received plaintext realm within the SUCI 101b can be verified by comparing the received MAC code for a SUCI 101b and a calculated MAC code output the ECIES 104j.

A certificate for device provider 104 can comprise Cert.Provider 104c and can include the device provider identity comprising provider ID 104a. A certificate 104c for device provider 104 can include a public key corresponding to the device provider private key SK.Provider 104e, a set of cryptographic parameters for the device provider public key, the identity of a certificate authority, and a digital signature for the certificate authority, as well as a specified digital signature algorithm used for the digital signature. As contemplated herein, a device provider public key may also be referred to as a device controller public key. A certificate 104c for device provider 104 and other nodes in a system 100 can comprise a certificate supporting X.509 v3 formats, and other formats or structures for a device provider certificate Cert.Provider 104c and other certificates as contemplated herein are possible as well. The cryptographic parameters can specify parameters for both the device provider public key and also the digital signature from a certificate authority. Cryptographic parameters in a certificate can specify algorithms such as RSA or elliptic curve cryptography (ECC) values, ECC curve names, key lengths in bits, signature algorithms, validity dates, encoding rules, etc. The signature of the certificate authority or certificate issuer for Cert.Provider 104c could be included in device provider certificate 104c.

Note that a device provider 104 could use a plurality of different device provider certificates 104c, and the device provider certificate 104c for a device 101 could be selected from a device database 104d for a device 101 using the SUPI 101a output from decryption function ECIES 104j. In some exemplary embodiments, the device provider certificate Cert.Provider 104c is also recorded in a device 101 as depicted in FIG. 1 before device 101 sends a SUCI 101b to MNO 102, such as during a device configuration step or a device manufacturing step. In other exemplary embodiments, device 101 may not record Cert.Provider 104c before device 101 sends a SUCI 101b to MNO 102, and for these embodiments Cert.Provider 104c could be received an verified by device 101 in a TLS handshake, where device 101 could verify Cert.Provider 104c using another "parent" certificate for Cert.Provider 104c such as certificate issuer 105 root certificate Cert.CI-root 105a.

A device provider 104 can record and use a device provider private key SK.Provider 104e (e.g. "secret key"). The private key can correspond to the public key in the device provider certificate Cert. Provider 104c. In exemplary embodiments, device provider 104 (i) internally generates a random number for the device provider private key SK.Provider 104e and using cryptographic algorithms 104s, (ii) generates the device provider public key in a Cert.Provider 104c, and (iii) stores a copy of a set of cryptographic parameters within the certificate Cert.Provider 104c, such as the values for an elliptic curve named curve and specification of digital signature algorithms. The generation of the public key for device provider certificate Cert.Provider 104c could be before or during device 101 manufacturing or distribution and before device 101 sends a SUCI 101b to a MNO 102. In this manner, a device provider certificate Cert.Provider 104c could be written to device 101 before device 101 sends a SUCI 101b to MNO 102.

In some exemplary embodiments, device provider 104 operates a parent or "intermediate" certificate authority or certificate issuer in order to generate and sign Cert.Provider 104c. The public key for SK.Provider 104e in Cert.Provider 104c could be signed by a device provider secret key SK.Provider-CI 104g for Cert.Provider-CI 104f. The public key for Cert.Provider-CI 104f could be signed by SK.Root 105b from certificate issuer 105, where the certificate authority/issuer signature in Cert.Provider-CI 104f can be verified with root certificate Cert.CI-root 105a which can be stored in a device 101. Although a single level of a certificate issuer between device provider certificate Cert.Provider 104c and root certificate Cert.CI-root 105a is depicted in FIG. 1, a device provider 104 could operate multiple levels of intermediate certificates between device provider certificate Cert.Provider 104c and root certificate Cert.CI-root 105a. In addition, although a single root certificate issuer 105 is depicted in FIG. 1, a system 100 could include multiple root certificate issuers 105, and device provider 104 could record multiple certificates Cert.Provider-CI 104f or Cert.Provider 104c signed by different root certificate issuers 105 with different SK.Root 105b from the different certificate issuers 105.

Cryptographic algorithms 104s can include the steps and logic for processor 104p in device provider 104 to conduct in order for device provider 104 to securely communicate with network 103. Note that a processor 104p can be equivalent to a processor 103p for a server 111 above, and a device provider 104 can operate a plurality of servers 111. Cryptographic algorithms can include symmetric ciphering algorithms, a random number generator, a key pair generation algorithm, digital signature algorithms, asymmetric ciphering algorithms, and key exchange algorithms. Cryptographic algorithms can also include a key verification step for verifying that a received public key is valid for an ECC curve. Cryptographic algorithms 104s can use libraries available from example cryptographic suites such as OpenSSL, crypto++, BouncyCastle, or Mozilla, and other possibilities exist as well without departing from the scope of the present invention. Cryptographic algorithms 104s can us inputs of keys such as public keys, private keys, and/or symmetric keys along with cryptographic parameters 104x in order to for device provider 104 to process cryptographic data including ciphertext, key exchanges, and digital signatures.

Cryptographic parameters 104x can specify values or settings for (i) conducting an ECDH or ECDHE key exchange to obtain or derive a shared secret, (ii) mutually deriving a symmetric ciphering key using at least the derived shared secret, (iii) using a symmetric ciphering algorithm with the symmetric ciphering key, and (iv) using a digital signature algorithm. Cryptographic algorithms 104s for device provider 104 can correspond or be equivalent to cryptographic algorithms 101s for device 101, and cryptographic parameters 104x for device provider 104 can correspond or be equivalent to cryptographic parameters 101x for device 101. Note that a server 111 for a network 103 or device provider 104 can store and operate with cryptographic parameters equivalent to the depicted cryptographic parameters 104x.

Device provider 104 can operate a plurality of servers with at least one processor 104p. A processor 104p can comprise a central processing unit (CPU) or a "system on a chip" and be similar to a processor 102p for a MNO 102 described above. Device provider user interface 104u can comprise a web-based interface for administrators of device provider 104 to manage the function and operation of device provider 104 as well as manage a plurality of devices 101. User interface 104u can support the addition of new devices 101 in a system 100, the deletion or revocation of existing devices 101 in a system 100, etc. User interface 104u can also allow changes in values and tables for a plurality of devices 101 in a device database 104d, where a device database 104d is depicted and described in connection with FIG. 3 below.

Device database 104d can record a plurality of values for a plurality of devices 101 in order for device provider 104 to manage or operate communications with device 101 through a network 103. Device database 104d can record for each device exemplary values of SUPI 101a, device certificate 101c, the provider ID 104a used by device 101, a device provider certificate 104c used by a device 101, etc. Additional details regarding the data stored in a device database 104d are depicted and described in connection with FIG. 3 below.

Although FIG. 1 depicts MNO 102, network 103, and device provider 104 as separate nodes or entities, in some exemplary embodiments different entities or function of the nodes could be combined. In one embodiment, a MNO 102 and a network 103 could be combined, such that a MNO 102 controls or operates the network 103. In this embodiment, then a MNO 102 would operate both a SEAF 102b and an AUSF 103*b*. Or, a network 103 could control or operate a MNO 102, such that the network 103 controls or operates both a SEAF 102*b* and an AUSF 103*b*. In addition, although a MNO 102 is depicted in FIG. 1, the wireless networking technology operated by MNO 102 with radios 102*r* could use WiFi based technology (e.g. based on 802.11 standards) and a collection of geographically distributed WiFi access points. The WiFi access points could be controlled by network 103 and a security anchor function 102*b* could be omitted. In another embodiment, the function and operation of a network 103 and a device provider 104 could combined, such that either (i) network 103 records the data and operates the function of a device provider 104, or (ii) a device provider 104 operates an AUSF 103*b*. Other possibilities exist as well for the combination of the data and functions for a MNO 102, network 103, and device provider 104 without departing from the scope of the present invention.

FIG. 2

FIG. 2 is a simplified message flow diagram illustrating an exemplary system with exemplary data sent and received by a device, a mobile network operator, a network, and a device provider, in accordance with exemplary embodiments. System 200 can include a device 101, a mobile network operator (MNO) 102, a network 103, and a device provider 104. The nodes or entities within system 200 were also depicted and described in connection with FIG. 1 above, where FIG. 2 depicts exemplary steps for the nodes and exemplary message flows between the nodes. Although a single device 101, MNO 102, network 103, and device provider 104 are depicted in a system 200, a system 200 could include a plurality of each of the depicted nodes connected via an IP network 107. In addition, data recorded for device 101 and device provider 104 depicted and described above in FIG. 1 (other than ephemeral PKI keys) can be recorded in the device 101 and device provider 104 depicted in FIG. 2 before the steps and message flows are conducted in FIG. 2. In addition, although depicted as "device provider 104" in FIG. 2, a collection of servers providing the functions depicted in FIG. 2 for "device provider 104" can be referred to as "device controller 104."

In order to support authentication of devices 101 with network 103, a MNO 102 could establish a secure session 201 with network 103. Secure session 201 could comprise establishing a secure communications link between the two servers using protocols such as TLS, IPSec, a virtual private network (VPN), a secure shell (SSH), or similar networking, transport, or application layer technologies in order to establish secure communications between MNO 102 and network 103. Secure session 201 can utilize certificates for each of MNO 102 and network 103 in order to provide mutual authentication and mutual key derivation for a symmetric encryption key in secure session 201. Secure session 201 can also be conducted over IP network 107, although the secure session 201 could also be established or conducted through a private network. Other possibilities exist as well for establishing a secure session 201 between MNO 102 and network 103 without departing from the scope of the present disclosure.

In order to support authentication of devices 101 with network 103, a network 103 and device provider 104 could establish a secure session 202. Secure session 202 can be equivalent to secure session 201 described in the paragraph above. Secure session 202 could use certificates from both network 103 and device provider 104 for mutual authentication and the secure derivation of encryption keys for the secure session. Note that subsequent data transmitted from device provider 104 to network 103 through the secure session 202 can be trusted by network 103 on the basis of the trust for secure session 202. For example, network 103 and AUSF 103*b* could receive a device certificate 101*c* for a device 101, where the device certificate 101*c* may not be authenticated with a certificate chain and a root certificate recorded or used by network 103. However, network 103 could still trust the device certificate 101*c* since the device certificate 101*c* could be received through secure session 202, where secure session 202 can be mutually authenticated using certificates for both network 103 and device provider 104. In some exemplary embodiments, both secure session 201 and secure session 202 are established using TLS 1.3.

At step 203, device 101 can power on and load firmware and configuration data in order to connect with wireless network 102. A step 203 can also include firmware or software in device 101 loading a RF module or radio 101*r* within device with an operating configuration such as MNO parameters 101*g* in FIG. 1 (such as frequencies to use, wireless technology to use such as 5G or WiFi 6, etc.). Step 203 can include device 101 scanning for available mobile networks 102 and then selecting a preferred mobile network. In exemplary embodiments, device 101 scans for mobile network identities broadcast in system information blocks, where the mobile network identity such as mobile network ID 102*a* matches the value for a mobile network in a realm for a SUPI 101*a* recorded by device 101.

In other words, device 101 could include multiple SUPI 101*a* with different realms for different networks 103 and device providers 104, and search for a MNO 102 in an RF beacon or signal that matches a realm for one of the multiple SUPI 101*a*. For other embodiments, the MNO ID 102*a* may not be included in a portion of a realm within a SUPI 101*a*, and a device 101 could select the MNO 102 using MNO parameters 101*g*. At the conclusion of a step 203, device 101 can select and store a SUPI 101*a* to use with a MNO 102. A step 203 can also include device 101 selecting MNO parameters 101*g* based on an observed and available MNO 102 for a radio 101*r* in device 101. The selection of a SUPI 101*a* for device 101 in a step 203 can include the selection of (i) a device provider 104 provider ID 104*a* for a realm of the SUPI 101*a* and (ii) a selection of network identity network ID 103*a* for a realm of SUPI 101*a*. The values for PK-ECIES.Provider 101*e* and ECIES Parameters 101*f* can be selected in a step 203 based on the provider ID 104*a* for the SUPI 101*a*. As one example a SUPI 101*a* selected in a step 203 could comprise an exemplary value of "XXXXX@company.aws.com", where XXXXX is the user name, "company" is the provider ID 104*a* and "aws.com" is the network ID 103*a*.

At step 204, device 101 can conduct a radio resource connection (RRC) request with MNO 102 using a radio 101*r* and the selected MNO parameters 101*g*. The RRC can transition a radio 101*r* in device 101 from an idle state to an active state. In the active state, device 101 can transmit messages or data to MNO 102. A step 204 can also include device 101 generating an ephemeral PKI key pair of ePK.ECIES.Device 101*h* and eSK.ECIES.Device 101*i*. At step 101*j'* device 101 can conduct the ECIES 101*j* encryption function with secret key eSK.ECIES.Device 101*i* and public key PK-ECIES.Provider 101*e* in order to derive a symmetric ciphering key and an MAC key. The user name portion of a SUPI 101*a* can be input into the ECIES 101*j* along with the symmetric key and the MAC key in order to output a first portion the SUCI 101*b* comprising an encrypted user name for the device 101.

The realm portion of a SUPI 101*a* can be input into the ECIES 101*j* along with the MAC key in order to output a MAC code covering the realm portion the SUCI 101*b*, such that the realm portion can be verified using the MAC code. Or, a single MAC code for both the first portion of the SUCI 101*b* and the realm portion of the SUCI 101*b* could be generated or calculated in a step 204. As depicted in FIG. 2, the combination of an encrypted user name, selected provider ID 104*a* for a realm, and the selected network ID 103*a* for a realm can comprise a value 204*a*. The value 204*a* can also include a MAC code using the MAC key from ECIES 101*j* encryption function, such that a device provider 104 receiving and decrypting the value 204*a* comprising at least the SUCI 101*b* and the MAC code can verify the integrity of the value 204*a*.

Device 101 can then send the selected MNO 102 through (i) a wireless network operated by MNO 102 and (ii) the radio resource connection from step 203 a message 205, where the message 205 includes the public key ePK.ECIES-.Device 101*h* and the value 204*a*. MNO 102 and SEAF 102*b* can receive the message 205 and conduct a step 206 in order to process the message 205. At step 206, SEAF 102*b* can (i) read the plaintext realm for SUCI 101*b* in value 204*a*, and (ii) select the network 103 using the network ID 103*a* in a realm for SUCI 101*b*. In a preferred exemplary embodiment as depicted in FIG. 2, the suffix of the realm can comprise the network ID 103*a*, but in other embodiments the prefix of the realm could comprise the network ID 103*a*.

Note that MNO 102 and network 103 could have prior commercial and technical agreements for MNO 102 to forward device 101 authentication data to network 103 and AUSF 103*b*. If MNO 102 has no commercial relationship with network 103, or secure session 201 could not be established, or MNO 102 cannot forward the data in message 205, then MNO 102 can send device 101 an error message with an error code explaining the failure. Device 101 could then take corrective steps, such as selecting a different MNO 102 or different network 103 via a different SUPI 101*a* for device 101 in order to send a message 205 to the different MNO 102.

MNO 102 can then send network 103 and AUSF 103*b* a message 207 through secure session 201, where (i) message 207 includes ePK.ECIES.Device 101*h* and the value 204*a*, and (ii) the value 204*a* includes SUCI 101*b*. The AUSF 103*b* for network 103 can receive the message 207. At step 208, the AUSF 103*b* can read and process the plaintext data in the realm for SUCI 101*b* in value 204*a*. At step 208, the AUSF 103*b* can select the device provider 104 using the device provider ID 104*a* in the realm for SUCI 101*b*. In a preferred exemplary embodiment as depicted in FIG. 2, the prefix of the realm can comprise the provider ID 104*a*.

Note that network 103 and device provider 104 could have prior commercial and technical agreements for network 103 to forward device 101 authentication data to device provider 104. If network 103 has no commercial relationship with device provider 104, or secure session 202 could not be established, or network 103 cannot forward the data in message 207, then network 103 can send MNO 102 an error message with an error code explaining the failure. MNO 102 could then send device 101 an error code explaining the failure, such that device 101 could take corrective steps, such as selecting a different MNO 102 or different network 103 in order to send a message 205 to the different MNO 102. A step 208 can include AUSF 103*b* storing SUCI 101*b* in a network database 103*d* for subsequent use in identifying device 101, such as when receiving a "client hello" message 218 below with a SUCI 101*b* added to message 218 by SEAF 102*b*.

Network 103 and AUSF 103*b* can then send a message 209 to device provider 104 through secure session 202, where message 209 can include (i) MNO ID 102*a*, and (ii) ePK.ECIES.Device 101*h* and the value 204*a*, where the value 204*a* includes SUCI 101*b*. Note that the inclusion of MNO ID 102*a* can be useful for device provider 104 in a message 209, since (i) device 101 could connect with multiple different MNO 102, and (ii) network 103 could support multiple different MNO 102, and (iii) device provider 104 may need to know which MNO 102 is used by device 101 for billing or administrative purposes. In other words, without including MNO ID 102*a* in message 209 then device provider 104 may not know which MNO 102 that device 101 attempts to connect with.

Device provider 104 can then conduct a series of steps in order to process the message 209. At step 210, device provider 104 can read the plaintext provider ID 104*a* in SUCI 101*b* and use device database 104*d* in order to select (i) secret key SK-ECIES.Provider 104*b* and (ii) ECIES Parameters 101*f*. As depicted in FIG. 3 below for a device database 104*d*, a provider ID 104*a* can be uniquely associated with secret key SK-ECIES.Provider 104*b* and (ii) ECIES Parameters 101*f*. Device provider 104 can then conduct a verification of the received ePK.ECIES.Device 101*h* using the ECIES Parameters 101*f*. The verification step can comprise verifying that the received public key is on the curve specified by ECIES Parameters 101*f*, the public key value does not comprise the "point at infinity", etc.

Device provider 104 can then conduct a step 104*j'* using ECIES decryption function 104*j* in order to convert the ciphertext user name in SUCI 101*b* into plaintext. ECIES 104*j* was depicted and described in connection with FIG. 1 above. A step 104*j'* can also include deriving a MAC key and verifying a MAC code within value 204*a* in order to check the message integrity of SUCI 101*b*. The check of message integrity of SUCI 101*b* in a step 104*j'* can include verifying the message integrity of a plaintext realm portion of the SUCI 101*b* using a MAC key from ECIES 104*j*. In other words, device provider can securely store a SUPI 101*a* for device 101 after step 104*j'*. Device provider 104 can conduct a step 211 with the plaintext user name to query a device database 104*d* for data pertaining to device 101, and a step 211 can include verifying that device 101 with the SUPI 101*a* is authorized to connect with MNO 102 and/or network 103. In a step 211, device provider 104 can determine the MNO 102 that device 101 attempts to connect with based on the MNO ID 102*a* received in a message 209 above. If device 101 is not authorized to connect with MNO 102, then device provider 104 could send an error message to network 103 (for forwarding to device 101) and not proceed to the additional steps depicted in FIG. 2.

Although an ECIES decryption function 104*j* is depicted in FIG. 2 as being conducted by a device provider 104, in some exemplary embodiments a network 103 could conduct the ECIES decryption function 104*j* and send device provider 104 a message 209 with the SUPI 101*a* for a device 101 (instead of message 209 including a SUCI 101*b*). For these embodiments, then network 103 could store the values for secret key SK-ECIES.Provider 104*b* and parameters ECIES Parameters 101*f*, as well as operate the ECIES decryption function 104*j*. In other words, although FIG. 1 depicts values for secret key SK-ECIES.Provider 104*b* and parameters ECIES Parameters 101*f*, as well as the ECIES decryption function 104*j* as within a device provider 104, a network 103 could store the data and perform a step 104*j'* in some exemplary embodiments. In some exemplary embodiments, network 103 could conduct the step 104*j'* (instead of device provider 104 as depicted in FIG. 2) to decrypt the encrypted user portion within a SUCI 101b received from MNO 102 in a message 207 in order to generate a SUPI 101a for device 101. For the embodiment described in this paragraph, then a message 209 could include a SUPI 101a instead of a SUCI 101b, and network 103 could conduct the steps of 211 and 104j' instead of a device provider 104. For the embodiment described in this paragraph, then the depicted key of "PK-ECIES.Provider 101e" stored by device 101 can be associated with a network 103 instead of a device provider 104.

At step 212, device provider 104 can use the user name from SUPI 101a to query device database 104d for the device certificate cert.device 101c and also the device provider certificate cert.provider 104c recorded by device 101, as depicted and described above in connection with FIG. 1. Note that a device certificate cert.device 101c can include either (i) the SUPI 101a as the device identity within the certificate or (ii) the user name portion from a NAI for device 101. For some exemplary embodiments, a step 212 could omit the selection of either device certificate 101c or device provider certificate 104c, and either certificate could be omitted in a subsequent message such as message 213.

A step 212 can also include device provider 104 collecting an OSCP stapling 212a through root certificate Cert.CI-root 105a. OSCP stapling is described in the TLS 1.3 RFC 8446, and OSCP stapling 212a provides an updated signature from parent certificate issuers that the certificate has not been revoked. In exemplary embodiments, OSCP stapling 212a is provided for cert.provider 104c, such that device 101 could verify the OSCP stapling 212a using the certificate chain for cert.provider 104c recorded by device 101. OSCP stapling 212a can be important for device 101 because device 101 may not have connectivity to IP network 107 without successfully conducting an EAP-TLS authentication with MNO 102, but connectivity to IP network 107 would be required to check certificate revocation lists without OSCP stapling 212a. In other words, without OSCP stapling 212a from a step 212, device 101 may not feasibly be able to check for certificate revocation for the device provider certificate cert.provider 104c selected by device provider 104 in a step 212. Device 101 can receive cert.provider 104c in a subsequent "server hello" message in FIG. 2.

Device provider 104 can then send network 103 and AUSF 103b a message 213 through secure session 202, where message 213 can include the selected device provider certificate Cert.Provider 104c from a step 212, device certificate Cert.Device 101c (possibly w/ SUPI 101a) from a step 212, SUCI 101b, and OSCP stapling 212a for device provider certificate 104c. Note that the inclusion of SUCI 101b with message 213 (and SUPI 101a in a Cert.Device 101c) can provide AUSF 103b the mapping between SUCI 101b and SUPI 101a for a device 101. Network 103 and AUSF 103b can receive the message 213 and conduct a step 214 to store (i) device provider certificate Cert.Provider 104c and (ii) device certificate Cert.Device 101c for the SUPI 101a and (iii) SUCI 101b used by device 101 in a network database 103d as depicted in FIG. 3 below. In exemplary embodiments Cert.Provider 104c includes a subset of cryptographic parameters 104x and Cert.Device 101c includes a subset of cryptographic parameters 101x.

Network 103 could operate a network database 103d similar to device database 104d, where an exemplary network database 103d is depicted in FIG. 3 below. Network 103 could store received certificates such as device provider certificate Cert.Provider 104c and device certificate Cert.Device 101c for a plurality of devices 101 along with the SUCI 101b for devices 101 received in messages 207 and SUPI 101a for devices 101 received in messages 213. AUSF 103b can determine the SUPI 101a for device 101 based on the SUPI 101a within a device certificate 101c, and both the values for SUPI 101a and string or file for device certificate 101c could be stored in a network database 103d as depicted in FIG. 2 below. Or, in another exemplary embodiment the SUPI 101a could also be sent external to a device certificate in a message 213. Network 103 and AUSF 103b can then use a network database 103d to select device provider certificate Cert.Provider 104c and device certificate Cert.Device 101c in subsequent steps, such as a step 219a using the SUPI 101a or SUCI 101b for a device 101. In addition, a message 213 from device provider 104 to network 103 could include a user name or identity of device 101 separate form or instead of a SUPI 101a. In other words, the realm portion of a SUPI 101a is not required for a message 213 and a device identity in the form of a user name from a NAI for device 101 can be sufficient for network 103 to conduct subsequent steps and messages as depicted in FIG. 2.

In addition, although message 213 with Cert.Provider 104c and Cert.Device 101c is depicted as being sent by device provider 104 after the receipt of a message 209, device provider 104 could send Cert.Provider 104c and Cert.Device 101c to network 103 before a message 209 and after the establishment of secure session 202. Device provider 104 could send Cert.Provider 104c and Cert.Device 101c for a plurality of different devices 101. By sending message 213 as depicted in FIG. 2, then OSCP stapling 212a can be more current or more "fresh" for device 101. In addition, a network 103 could record a plurality of device provider certificates Cert.Provider 104c in a network database 103d before network 103 receives a message 213, and in this embodiment then a message 213 could include an identifier of a device provider certificate Cert. Provider 104c (such as a certificate identity) instead of the full certificate as a *.pem file or equivalent. Further, a network 103 could record a plurality of device certificates Cert.Device 104c in a network database 103d before network 103 receives a message 213, and in this embodiment then a message 213 could include an identifier of a device certificate Cert.Device 101c (such as a certificate identity) instead of the full certificate as a *.pem file or equivalent.

Further, although device provider certificate Cert.Provider 104c and device certificate Cert.Device 101c are depicted in FIG. 2 as being sent in the same message 213, a message 213 could be sent in parts, such as the data being transmitted via a physical interface in device provider 104 separately. A device provider certificate Cert.Provider 104c or device certificate Cert.Device 101c could be selected by device provider at a later point in time than depicted in FIG. 2, such as device provider 104 sending device provider certificate Cert.Provider 104c and/or device certificate Cert.Device 101c after the receipt of a message 220 from network 103. A step 211 to select the device provider certificate Cert.Provider 104c or device certificate Cert.Device 101c could be conducted after device provider 104 receives a message 220. Other possibilities for the sequence and timing for a device provider 104 to send a network 103 a device provider certificate Cert.Provider 104c or device certificate Cert.Device 101c are possible as well without departing from the scope of the present disclosure.

Note that network 103 and AUSF 103b can trust Cert.Provider 104c and Cert.Device 101c, since the certificates can be delivered through the secure session 202. Or, in a step 214 network 103 could conduct a certificate verification of Cert.Provider 104c and Cert.Device 101c through a root certificate, such as Cert.CI-root 105a. Note that Cert.Provider 104c and Cert.Device 101c do not have to be verified through a root certificate stored by network 103, since the certificates are received through secure session 202, where secure session 202 can be established with other certificates for device provider 104 (and the other certificates for a secure session 202 could be verified through a different root certificate than the Cert.CI-root 105a recorded by device 101 as depicted in FIG. 1). A step 214 can also include AUSF 103b verifying that AUSF 103b supports the cryptographic parameters 101x and 104x in the certificates received in a message 213. In other words, AUSF 103b can use a step 214 to verify that AUSF 103b can conduct a TLS 1.3 session using the parameters and certificates for Cert.Provider 104c and Cert.Device 101c received in a message 213.

At step 103q' AUSF 103b can generate an ephemeral private key for a TLS session with device 101 comprising eSK.TLS.Network 103q and the parameters within Cert.Provider 104c. In other words, AUSF 103b can read the named elliptic curve and key length from Cert.Provider 104c received in message 213 and generate a private key for the named curve and key length in a step 103q'. The use and function of an ephemeral secret key eSK.TLS.Network 103q was also described above in FIG. 1. AUSF 103b can generate the corresponding public key ePK.TLS.Network 103n. A step 103q' could also be conducted after receiving a "client hello" message 218. AUSF 103b can then send device 101 an "EAP-TLS Start" message 215, which is also depicted as step 6 in Figure B.2.1.1-1 of 3GPP TS 33.501 version 15.1.0. Note that message 215 is sent to MNO 102 and MNO 102 can transmit message 215 through the radio resource connection established by device 101 in step 204 above. Where MNO 102 functions as a "pass through" entity for messages between network 103 and device 101, then the vertical line for MNO 102 in FIG. 2 is omitted.

Device 101 can receive the "EAP-TLS" start message 215 can conduct a series of steps in order to generate the "client hello" message. Although TLS version 1.3 according to IETF RFC 8446 is depicted in FIG. 2, subsequent and related version of a transport layer security protocol could be used as well between device 101 and an AUSF 103b operating in network 103. In a step 216, device 101 using processor 101p can select parameters for a subsequent "client hello" message 218 using the cryptographic parameters in the stored device provider certificate 104c associated with a device provider ID 104a used in the realm of a SUCI 101b transmitted by device 101 in a message 205. In this manner, the set of cryptographic parameters for a "client hello" message 218 and a "server hello" message 227 can be reasonable assured to be compatible before the "client hello" message 218 is transmitted by device 101. In other words, in exemplary embodiments, a device 101 can store a device provider certificate 104c before device 101 sends a message 205, including storing the device provider certificate 104c during a configuration of device 101 or a secure session for device 101 before device 101 sends a message 205.

The selected parameters in a step 216 can include at least a digital signature algorithm such as the elliptic curve digital signature algorithm as supported by TLS version 1.3 (or another TLS version for messages 218 and 227) and also a named elliptic curve supported by the TLS version in subsequent messages 218 and 227. In exemplary embodiments, the set of cryptographic parameters selected from stored device provider certificate Cert. Provider 104c can be a subset of cryptographic parameters 101x for device 101. Or, in some exemplary embodiments device 101 could select the entire set or a larger subset of cryptographic parameters 101x in a step 216 in order to generate a "client hello" message 218. The selected set of cryptographic parameters for device 101 in a step 216 can include data for extensions 217a below. Device 101 could also use cryptographic algorithms 101s with the selected parameters from a step 216 in order to generate a "client hello" message 218. Device 101 could also store first list of cryptographic algorithms 101s and a second list of cryptographic parameters 101x for device 101 and generate a extensions 217a using the first list and the second list.

In a step 101q', device 101 can generate device ephemeral private key eSK.TLS.Device 101q and the corresponding device ephemeral public key ePK.TLS.Device 101n using the selected set of cryptographic parameters from a step 216 above. The generation of ePK.TLS.Device 101n and eSK.TLS.Device 101q were also previously described above for device 101 in FIG. 1. Note that the ephemeral private and public key for device 101 and the ephemeral private and public key for network 103 can support post-quantum cryptographic algorithms, as specified by cryptographic algorithms and cryptographic parameters stored in the two nodes. At the conclusion of a step 101q', device 101 can conduct a step 217 in order to complete the processing or generation of the "client hello" message 218. The "client hello" message 218 generated in a step 217 can include a random number generated by device 101 using cryptographic algorithms 101s, a list of cipher suites supported by device 101 such as a symmetric ciphering algorithm and a cipher block chaining mode, the identity or data for a key derivation function including a hash function, and the list of supported extensions 217a according to section 4.2 of IETF RFC 8446. In exemplary embodiments, the data for a "client hello" message 218 can be generated in a step 217 using the set of cryptographic algorithms 101s in device 101 and parameters from device provider certificate Cert.Provider 104c.

Device 101 can process extensions 217a, where the extensions 217a can either (i) omit a certificate_authorities extension or (ii) include at least a certificate authority specified by cert.provider 104c as stored by device 101, or (iii) the identity for the root certificate issuer 105, where device 101 includes a root certificate cert.root 105a as depicted in FIG. 1 above. For some exemplary embodiments, a device 101 can verify a subsequent certificate received from AUSF 103b as cert.provider 104c by simply comparing if the received cert.provider 104c from AUSF 103b matches the cert.provider 104c stored in memory 101m, as depicted in FIG. 1 above. The previous sentence pertains to verifying a received cert.provider 104c from AUSF 103b is trusted, and a device 101 would use the public key in cert provider 104c in order to verify the digital signature in a "CertificateVerify" 222a below segment or data within a TLS handshake with MNO 102 and AUSF 103b. In this manner the verification through a certificate authority chain could be omitted in exemplary embodiments, thereby simplifying mutual authentication for device 101 and AUSF 103b/MNO 102. Note that device 101 may not have access to IP network 107 other than sending messages to SEAF 102b, and thus device 101 may not have the ability to verify a server certificate from AUSF 103b (different than device provider certificate 104c) that does not verify through an existing root certificate or certificate authority previously stored in device 101, if the received certificate from AUSF 103b does not have a chain terminating with a stored root certificate 105a.

Note that Cert.Provider 104c and device certificate Cert.Device 101c can be stored by device 101 before device 101 sends "client hello" message 218, and also in a manner under the control of device provider 104 (including during any of device configuration, device manufacturing, or device distribution), and thus device provider 104 can take steps when processing device provider certificate Cert.Provider 104c and device certificate Cert.Device 101c to ensure the specified cryptographic parameters within the certificates are compatible. Device provider certificate Cert.Provider 104c and device certificate Cert.Device 101c can have compatible or equivalent sets of cryptographic parameters (such as specifying the same digital signature algorithm and mutually supported or equivalent named elliptic curves), and in this manner device 101 and AUSF 103b can be reasonably assured that (i) the negotiation and use of cryptographic parameters in TLS messages such as messages 218 and 227 will be compatible and (ii) the negotiation of a TLS handshake in messages 218 and 227 will be successful.

Device provider can select or specify for device 101 cryptographic parameters including extensions in section 4.2 of TLS version 1.3 for cryptographic algorithms 101s (such as during a device configuration step to load device 101 with the data depicted and described in FIG. 1). The selected or specified cryptographic parameters can be compatible with device provider certificate Cert.Provider 104c and device certificate Cert.Device 101c. In this manner, a TLS session can be reasonably assured to successfully be negotiated between device 101 and AUSF 103b before the series of steps and message flows depicted in FIG. 2, including a message 218, a message 227, and a message 233.

In other words, through the use of (i) device provider certificate Cert.Provider 104c for AUSF 103b as a server certificate and (ii) cryptographic algorithms 101s supporting device provider certificate Cert.Provider 104c for AUSF 103b, a TLS session can be assured to be successful. This contrasts with conventional technology, where if AUSF 103b selects and uses a server certificate not stored in device 101 then the negotiation of the TLS session is more likely to fail from both (i) incompatible sets of cryptographic parameters or cryptographic algorithms, and (ii) the server certificate may not be able to be verified through a certificate chain in device 101 up to a stored root certificate Cert.CI-root 105a, and (iii) device 101 may not have access to IP network 107 in order to obtain additional certificates that could verify a server certificate through a stored root certificate.

If a server certificate selected by AUSF 103b for use in a TLS session is both (i) not previously securely received and stored by device 101, and (ii) is authenticated or verified through a certificate chain with a different root certificate than Cert.CI-root 105a stored by device 101, then device 101 may not be able to verify the sever certificate selected by AUSF 103b (different than Cert.Provider 104c stored by device 101). The potential issues for AUSF 103b to select a server certificate different than device provider certificate Cert.Provider 104c stored by device 101 are compounded by the likely scenarios where (i) hundreds of different AUSF 103b may be used globally with different cryptographic parameters and cryptographic algorithms used for the server certificate and also (ii) server certificates with different verifying certificate chains up to different root certificates. The steps and message flows depicted in FIG. 2, along with supporting data recorded as depicted in FIG. 1, provide a solution to the significant number of issues that can arise when an AUSF 103b uses a server certificate different than device provider certificate Cert.Provider 104c. In summary to solve the many potential issues and problems of an AUSF 103b using a server certificate different than the device provider certificate Cert.Provider 104c stored by device 101, the device 101 can (i) store the device provider certificate Cert.Provider 104c before sending a SUCI 101b in a message 205, (ii) the AUSF 103b can receive the device provider certificate Cert.Provider 104c from a device provider 104 in a message 213, and (iii) use the device provider certificate Cert.Provider 104c when conducting a TLS session with device 101 as depicted in FIG. 2.

Device 101 can then send the TLS "client hello" message 218 to MNO 102 and through SEAF 102b, where MNO 102 forwards the "client hello" message 218 to network 103 and AUSF 103b. The "client hello" message 218 through MNO 102 is also depicted as message 8 and 9 in Figure B.2.1.1-1 of 3GPP TS 33.501 version 15.1.0. A "client hello" message 218 can include a key share value of ePK.TLS.Device 101n, which is depicted in FIG. 2. A "client hello" message 218 can include additional data for a "client hello" message as described in section 4.1.2 of IETF RFC 8446, including the data processed by device 101 in 216 and 217, such as selected extensions 217a. Note that MNO 102 and SEAF 102b can include a Nausf UEAuthentication_Authenticate Request value with the message 218a, such that AUSF 103b can determine which device 101 the "client hello" message 218 is associated with. In exemplary embodiments and also as supported by 3GPP TS 33.501 version 15.1.0, the Nausf UEAuthentication_Authenticate Request received with message 218a by AUSF 103b can include the SUCI 101b. As depicted in FIG. 2, the SEAF 102b can include the SUCI 101b with the "client hello" in message 218a sent to AUSF 103b that includes the "client hello" message 218 from device 101.

AUSF 103b can receive message 218a and conduct a series of steps to process the "client hello". AUSF 103b can conduct a verification 219a of the received ePK.TLS.Device 101n using the named curve specified by cryptographic parameters within the "client hello" message 218 within extensions 217a. The verification step can comprise verifying that the received public key is on the curve specified by the received cryptographic parameters in extensions 217a, the public key value does not comprise the "point at infinity", etc. The verification step 219a can comprise the verification step within section 4.2.8.2. of IETF RFC 8446.

AUSF 103b can then conduct a step 219b in order to select at least device provider certificate Cert.Provider 104c from a network database 103d using the SUCI 101b received along with the "client hello" from SEAF 102b in a message 218a. As noted above in a step 214 for AUSF 103b, the AUSF 103b can previously store device provider certificate Cert.Provider 104c, device certificate Cert.Device 101c, SUPI 101a, and SUCI 101b for device 101 in network database 103d after receiving the message 213 above from device provider 104. A step 219b can also comprise AUSF 103b also selecting the device certificate Cert.Device 101c from a network database 103d using the SUCI 101b received along with the "client hello" from SEAF 102b, although the device certificate Cert.Device 101c could be selected at a later time, such as after the receipt of a message 233. An AUSF 103b can use a step 219b to select a device provider certificate 104c from a network database 103d using the SUCI 101b from message 218a for conducting an EAP-TLS authentication. The selected device provider certificate 104c from a step 219b can comprise the server certificate for an AUSF 103b to use when conducting an EAP-TLS authentication with device 101, such as the selected device provider certificate 104c comprising the server certificate below in a "server hello" within message 227.

At step 219c, AUSF 103b can further process the "client hello" by taking the steps specified in IETF RFC 8446, such as generating a server random number, selecting extensions 219d according to section 4.2 of RFC 8446 based on a subset of extensions 217a received in the "client hello" message 218, generating a certificate request 219e according to section 4.3.2 of RFC 8446, etc. The certificate request 219e from a step 219c can comprise a request for device 101 to mutually authenticate with AUSF 103b using at least a device certificate 101c. In exemplary embodiments, for security and commercial reasons, a device provider 104 may prefer to record the secret key for the public key in device provider certificate Cert.Provider 104c. For these embodiments, then AUSF 103b may not be able to internally generate the digital signature for a certificate verify according to section 4.4.3 of RFC 8446. AUSF 103b can then send device provider 104 a message 220, where message 220 include "key share" 103n, which comprises ePK.TLS.Network 103n, Extensions 219d, CertificateRequest 219e, and device provider certificate cert.provider 104c. Note that message 220 can also include identifying information for data within the message 220, such as a SUPI 101a (depicted) or a SUCI 101b, such that device provider 104 could track which device 101 the data within message 220 is associated with.

In exemplary embodiments, a CertificateRequest 219e processed by AUSF 103b can either (i) omit a certificate_authorities extension or (ii) use at least a certificate authority specified by cert.device 101c recorded for device 101 in a network database 103d and also recorded by device 101. An AUSF 103b can verify a subsequent certificate received by device 101 as cert.device 101c by comparing if the received cert.device 101c from device 101c matches the cert.device 101c received from device provider 104 in a message 213, and in this manner the verification through a certificate authority chain could be omitted in exemplary embodiments thereby simplifying mutual authentication for device 101 and AUSF 103b/MNO 102 while maintaining security. The sentence above pertains to verifying a received cert.device 101c from device 101 is trusted, and an AUSF 103b would use the public key in cert.device 101c in order to verify the digital signature in a "CertificateVerify" segment within a TLS handshake with device 101. "CertificateVerify" in FIG. 2 and as described herein can comprise a "CertificateVerify" according to section 4.4.3 of RFC 8446.

Note that a message 220 from AUSF 103b to device provider 104 could omit device provider certificate cert.provider 104c since device provider 104 previous sent 104c to AUSF 103b, however including all the depicted elements of a message 220 in one package or string of data segments can help ensure the input for a digital signature by device provider 104 will match exactly the bit sequence and message/segment structure as the "message to sign" input into a digital signature algorithm operated by device provider 104 with SK.Provider 104e in order to generate below a "CertificateVerify" 222a digital signature. In other words, in exemplary embodiments, the contents of a message 220 can include all of the data for AUSF 103b to generate and send a "CertificateVerify" 222a digital signature in a subsequent "server hello" message 227.

Device provider 104 can receive the message 220 with identifying information for device 101 such as the SUPI 101a (depicted) or a SUCI 101b, and in a step 221 verify the selected extensions 219d are supported by device 101 using data recorded by a device 101 in a device database 101d. Device provider 104 could compare that selected extensions 219d are supported by cryptographic algorithms 101s and cryptographic parameters 101x stored in device 101. Note that although not depicted for a device database 101d in FIG. 3 below, a device database 104d could store a first list of cryptographic algorithms 101s and a second list of cryptographic parameters 101x in a device database 104d and in a step 221 determine that the selected extensions 219d are supported by device 101 by querying for the first list and the second list in the device database 104d using the SUPI 101a or other identifying information for device 101 in message 220. In a related exemplary embodiment, device provider 104 could send network 103 and AUSF 103b the first list of cryptographic algorithms 101s and a second list of cryptographic parameters 101x for device 101 using SUCI 101b in a message 213 above. Network 103 could use the first list and the second list in order to select extensions 219d in a step 219b, where the selected extensions 219d can be (i) the set of extensions 217d from a "client hello" message 218 or a (ii) a subset of the extensions 217d.

Step 221 can also determine that the CertificateRequest 219b can be properly processed by device 101, such as including a certificate_authorities extension with at least one certificate authority certificate stored in device 101, such as the certificate authority specified for cert.device 101c. At step 222, device provider can generate a digital signature comprising a "CertificateVerify" for the data received in a message 220 using the secret key SK.Provider 104e corresponding to the public key in Cert.Provider 104c and also the cryptographic parameters for the digital signature as specified in Cert.Provider 104c or extensions 219d. The digital signature processed in a step 222 can comprise a "CertificateVerify" 222a. In a step 222, device provider 101 could select the secret key SK.Provider 104e from a device database 104d using the device provider certificate cert.provider 104c received in a message 220. As contemplated herein, the certificate 104c received in a message 220 could also comprise a unique certificate identity for the certificate 104c, such that device provider 104 can identify the device provider certificate cert.provider 104c using the unique certificate identity.

Device provider 104 can then send AUSF 103b a message 223 with a digital signature of "CertificateVerify" 222a, where the "CertificateVerify" 222a can be over the data sent by AUSF 103b in a message 220 (e.g. "key share" 103n, which comprises ePK.TLS.Network 103n, Extensions 219d, CertificateRequest 219e, and device provider certificate cert.provider 104c). In this manner from the combinations of a step 219c, message 220, and step 222, a AUSF 103b can (i) generate a "message to sign" for a "server hello" comprising key_share 103n, Extensions 219d, CertificateRequest 219b, Certificate 104c, and (ii) receive a digital signature of "CertificateVerify" 222a from device provider 104 over the "message to sign". AUSF 103b can use the received digital signature of a "CertificateVerify" 222a in order to generate a complete "server hello" message 227 for a SUCI 101b that could be successfully processed by device 101 using the authentication and encryption steps specified for TLS 1.3 in IETF RFC 8446.

Although FIG. 2 depicts device provider 104 generating the digital signature for "CertificateVerify" 222a, in some exemplary embodiments (i) an AUSF 103b could generate the "CertificateVerify" 222a, and (ii) the messages 220, step 222, and message 223 could be omitted from a system 200. For this embodiment, then device provider 104 could send the private key SK.Provider 104e for device provider certificate Cert.Provider 104c through secure session 202, such as in a message 213 above. For this embodiment, a network 103 could store the private key SK.Provider 104*e* for device provider certificate Cert.Provider 104*c* in a network database 103*d* and select the private key SK.Provider 104*e* using the selected device provider certificate Cert.Provider 104*c* for a device 101 SUCI 101*b*, where the selection of a device provider certificate Cert.Provider 104*c* for a device 101 SUCI 101*b* was described above for a step 219*b*.

AUSF 103*b* can receive message 223 and conduct steps to generate a "server hello" response for the received "client hello" from device 101. In step 224, AUSF 103*b* could verify the digital signature for "CertificateVerify" 222*a* using the public key and parameters in device provider certificate 104*c* in order to confirm the digital signature is correct and can be properly processed by device 101 with the public key and parameters in device provider certificate 104*c*.

For some exemplary embodiments of a system 200, a network 103 could use a step 219*b* to select a server public key for use in an EAP-TLS authentication with device 101 in a subsequent "server hello" message 227 instead of using a received device provider certificate 104*c*. Network 103 could record and use a corresponding server private key for the server public key. For these embodiments, a network 103 or AUSF 103*b* could send a server certificate for the selected server public key in a message 220, instead of the data depicted for a message 220 in FIG. 2. For these embodiments, a message 220 could comprise a "certificate signing request" for the server public key in the selected server certificate. The "certificate signing request" from network 103 for the selected server certificate/server public key could comprise a request as described in the Wikipedia article titled "Certificate Signing Request" from May 1, 2019, which is herein incorporated by reference in its entirety. Device provider 104 could receive the "certificate signing request" for the server public key in the server certificate in the message 227. Device provider could generate a new certificate for the server public key by signing with the device provider private secret key SK.Provider 104*e*. The device provider secret key SK.Provider 104*e* could be selected from a device database 104*d* using the realm portion of a SUPI 101*a* in a message 220. For these embodiments, device provider 104 could send network 103 and AUSF 103*b* the new certificate in a message 223. Network 103 could then include the new server certificate in a subsequent "server hello" message 227, where the "CertificateVerify" 222*a* could be a digital signature generated by network 103 using the server private key for the server public key in the new certificate, where the new certificate could be received from device provider 104 in response to the "Certificate Signing Request". For these embodiments, a device 101 could (i) verify a "server hello" message using the server public key in the new server certificate, and (ii) verify the new server certificate using the device provider certificate 104*c* stored in device 101, as depicted in FIG. 1.

At step 225, AUSF 103*b* can conduct an ECDH key exchange with device ephemeral public key ePK.TLS.Device 101*n* received in message 218 and server ephemeral private key eSK.TLS.Network 103*q* derived in a step 103*q*' in order to mutually derive shared secret 225*a* and then derive a symmetric ciphering key 225*b* and an associated MAC key. A step 225 can follow the steps and procedures as specified by section 7 of RFC 8446 for the shared secret 225*a* and then deriving the symmetric ciphering key 225*b*, although other possibilities exist as well for the derivation of a shared secret key 225*a* and a symmetric ciphering key 225*b* without departing from the scope of the present invention. As supported by section 7 of RFC 8446, (i) a first portion of a symmetric ciphering key 225*b* and an associated MAC key for encryption by AUSF 103*b* and decryption by device 101 can be different than (ii) a second portion of a symmetric ciphering key 225*a* and an associated MAC key for decryption by AUSF 103*b* and encryption by device 101. However, both device 101 and AUSF 103*b* can conduct a step 225 in order to derive both the first and second portions of a symmetric ciphering key 225*b*.

At step 225, AUSF 103*b* can derive a shared secret 225*a* with device 101 as a point with x and y coordinates, where the device ephemeral public key is raised to the power of the scalar ephemeral private key with a modulus according to the named curve to for the PKI keys in cryptographic parameters associated with the keys and also in extensions 219*d* selected in a step 219*b*. The x coordinate of the resulting point can comprise a shared secret 225*a*. AUSF 103*b* or network 103 could store the derived shared secret 225*a* and the symmetric ciphering key 225*b* from a step 225 in a network database 103*d* as depicted in FIG. 3 below, along with the SUCI 101*b* received in a message 218 and/or the combination of SUCI 101*b* and SUPI 101*a* received in a message 213. The symmetric key 225*b* and the associated MAC key can be derived from the shared secret 225*a* using a key derivation function (KDF) or a secure hash algorithm mutually shared with device 101. The KDF and secure hash algorithm could be specified and shared between device 101 and AUSF 103*b* in extensions 217*b* and extensions 219*d*, such as a secure hash algorithm of SHA-256, SHA-384, etc.

Device 101 can take equivalent steps with the corresponding keys as used by AUSF 103*b* in order to derive the shared secret 225*a* and the symmetric key 225*b* and an associated MAC key, which is also described in section 7 of IETF RFC 8446. At step 226, AUSF 103*b* can complete the processing of a "server hello" message according to RFC 8446 by encrypting the values Extensions 219*d*, CertificateRequest 219*e*, Certificate 104*c*, OSCP stapling 212*a* (from message 213), and Certificate Verify 222*a* with the symmetric ciphering key 225*b* derived in a step 225.

Other data could be included in a "server hello" message as well without departing from the scope of the present invention. Although Annex B of 3GPP TS 33.501 version 15.1.0 describes the use of TLS version 1.2, a MNO 102 and SEAF 102*b* and AUSF 103*b* in a system 200 could support the use of TLS version 1.3. Or, the sequence of steps and messages in FIG. 2 for a system 200 could be adjusted to support TLS version 1.2 without departing from the scope of the present disclosure. Further, future versions of EAP-TLS authentication for 5G networks and 3GPP networks could support TLS version 1.3, where the future versions could be compatible with the steps and message flows depicted for a system 200 in FIG. 2.

AUSF 103*b* can then send through MNO 102 the "server hello" message 227. Note that AUSF 103*b* can insert or add the SUCI 101*b* for device 101 external to the "server hello" message 227, such that SEAF 102*b* and MNO 102 can send the "server hello" message 227 to the correct device 101. In other words, MNO 102 can use the SUCI 101*b* as external to the "server hello" message 227 in order to route the message 227 to device 101 through base stations and at least one gnodeb with a radio 102*r*. The data within a "server hello" message is depicted in FIG. 2 and also described above with a step 226. The bracket values of "1" and "1" in for message 227 and other messages or data depicted in Figures herein depict that the ciphertext data is encrypted with the derived symmetric ciphering key, such as key 225*b* from a step 225 and also verified with a MAC code using a MAC key from a step 225. The depiction of the key 225*b* next to the brackets for message 227 indicate that the message is encrypted with at least a mutually derived symmetric ciphering key 225b and does not suggest or indicate that the key 225b is transmitted with the message.

Device 101 can receive the "server hello" message 227 and take steps in order to process the message. At step 219a, device 101 can verify the received ephemeral public key using the same steps as a step 219a for AUSF 103b above, which can also comprise the verification step 4.2.8.2 in RFC 8446. At step 228, device 101 can conduct and ECDH key exchange with device ephemeral private key eSK.TLS.Device 101q and server ephemeral public key ePK.TLS.Network 103n derived in a step 103q' in order to mutually derive a shared secret and then a symmetric ciphering key and a MAC key. A step 228 can follow the steps and procedures as specified by section 7.4 of RFC 8446. At step 228, device 101 can derive a shared secret with AUSF 103b as a point with x and y coordinates, where the network/server ephemeral public key 103n is raised to the power of the scalar device ephemeral private key with a modulus according to the named curve to for the PKI keys. The x coordinate of the resulting point can comprise a shared secret 225a, which was mutually derived by the AUSF 103b in a step 225. The symmetric key 225b and the MAC key can be derived from the shared secret 225a using a secure hash function, and additional data shared between device 101 and AUSF 103b in messages 218 and 217 could be input into the secure hash function with the shared secret 225a. A step 228 can also comprise device 101 decrypting the ciphertext data from a message 227 using the derived symmetric ciphering key 225b and verifying message 227 integrity with the MAC code and the MAC key derived in step 228.

A step 229 can comprise device 101 verifying the digital signature in the digital signature for "CertificateVerify" 222a using the public key and parameters in device provider certificate 104c in order to confirm the digital signature is correct. Device 101 could confirm the received value for "CertificateVerify" 222a matches a calculated value by device 101 for "CertificateVerify" 222a. The message or data input into the digital signature algorithm can comprise the data key_share 103n, Extensions 219d, CertificateRequest 219e, Certificate 104c, and OSCP stapling 212a, and also follow the steps for signature verification in RFC 8446. Other possibilities exist as well for the steps to verify a digital signature of a "CertificateVerify" 222a using the public key in a device provider certificate 104c without departing from the scope of the present disclosure.

A step 230 can comprise device 101 verifying that the received device provider certificate 104c matches the recorded device provider certificate 104c in memory 101m as depicted in FIG. 1. Or, if device provider certificate 104c does not match the recorded device provider certificate 104c in memory 101m, then device 101 can conduct a series of steps to verify the received device provider certificate 104c up through at least one recorded and securely received certificate within device 101, such as a root certificate Cert.CI-root 105a. Note that in some embodiments, the sequence of steps 229 and 230 could be switched, and the order of other steps depicted as contemplated herein could be adjusted without departing from the scope of the present invention. In addition, a step 230 can comprise device 101 verifying an OSCP stapling 212a for embodiments where device provider certificate 104c does not match the recorded device provider certificate 104c. Further, a step 230 can comprise device 101 verifying an OSCP stapling 212a if the device provider certificate 104c matches the certificate 104c stored by device 101 in order to confirm the current validity status of the device provider certificate 104c (e.g. device 101 could determine that certificate 104c has not been revoked).

Note that the system 200 depicted in FIG. 2 can avoid the requirement that device 101 needs to verify OSCP stapling 212a, for embodiments where device provider 104 generates "CertificateVerify" 222a in a step 222. The presence of a "CertificateVerify" 222a, where device provider 104 generates the "CertificateVerify" 222a in a step 222 can confirm the certificate cert.provider 104c is valid for device 101. If the cert.provider 104c was revoked, then device provider 104 and/or AUSF 103b could decline to provide "CertificateVerify" 222a to device 101. If another party than device provider 104 obtained the secret key SK.Provider 104e, the party would not feasibly be able to use the key since MNO 102 only sends SUCI 101b for device 101 to AUSF 103b, and thus device 101 would not authenticate with a different AUSF 103b as specified in the realm of the SUCI 101b.

At step 231, device 101 can select a device certificate 101c that is compatible with the parameters received within message 228, such as with extensions 219d. A device 101 could record a plurality of different device certificates 101c, such as supporting different cryptographic parameters for digital signature algorithms and also different certificate authorities. Device 101 could use the data for extensions 219d, such as a certificate authority specified in extensions 219d, in order to select device certificate 101c. In some exemplary embodiments, the certificate authority for device certificate 101c can be device provider 104, where the digital signature for device certificate 101c is signed with the device provider certificate issuer secret key SK.Provider-CI 104g. In other words, in exemplary embodiments device 101 selects a device certificate 101c in a step 231 where the signature authority for device certificate 101c is the device provider certificate issuer for device provider 104. Or, in other embodiments, device 101 could record a single certificate 101c and AUSF 101c can verify the certificate 101c by comparing the certificate 101c received from device 101 with the certificate 101c received from device provider 104.

At step 232, device 101 can generate a digital signature for a "CertificateVerify" 232a over at least the selected device certificate 101c with the private key SK.Device 101d for the selected device certificate 101c using the parameters from extensions 219d in message 227. The private key SK.Device 101d is depicted and described above in connection with FIG. 1. Device 101 could follow the steps for generating a "CertificateVerify" in section 4.4.3 of RFC 8446, and other possibilities exist as well without departing from the scope of the present disclosure. A step 232 can include device 101 encrypting the device certificate 101c and the "CertificateVerify" 232a into a ciphertext with the symmetric ciphering key 225b derived in a step 228 above, as well as generating a MAC code using the derived MAC key.

Device 101 can then MNO 102 a message 233, where message 233 includes the ciphertext from a step 232 with the encrypted device certificate 101c and the encrypted digital signature of "CertificateVerify" 232a. Note that MNO 102 can use the radio resource connection of device 101 in order to track or identify device 101, and MNO 102 using SEAF 102b can append the SUCI 101b originally sent by device 101 in a message 205 to the message 233, equivalent to MNO 102 or SEAF 102b adding SUCI 101b to message 218 above. In other words, MNO 102 can track the radio resource connection used by device 101 in order to (i) append or add SUCI 101b to message 218 (e.g. message 218a received by AUSF 103b) (ii) append or add SUCI 101b to message 233 received by AUSF 103b. In other words, AUSF 103b can receive the message 233 with the SUCI 101b added, although device 101 may not add SUCI 101b to message 233. Or, in some exemplary embodiments device 101 can add SUCI 101b to both message 218 and message 233. As described below, AUSF 103b can use a network database 103d to record data for sessions with device 101, such as the SUCI 101b and the device provider certificate 104c as well as the server ephemeral private key eSK.TLS.Network 103q and symmetric ciphering key 225b associated with a device 101 and TLS messages. As depicted for a network database 103d in FIG. 3 below, a network 103 could also store the derived symmetric ciphering key 225b from a step 225, and MAC key as well (although a MAC key in database 103d is not depicted in FIG. 3), in order to select symmetric ciphering key 225b using the SUCI 101b from MNO 102 and decrypt the ciphertext in a message 233.

In exemplary embodiments, the device provider certificate 104c received from device provider 104 by AUSF 103c can function as the server certificate for AUSF 103b with device 101. AUSF 103b can use a plurality of different server certificates with a plurality of different devices, and the proper certificate for AUSF 103b to use could be tracked in a network database 103d and selected for a device 101 from messages via MNO 102 using the SUCI 101b added to the messages by MNO 102.

In a step 234, AUSF 103b can use the selected (x) symmetric key 225b from a network database 103d for (y) SUCI 101b received in a message 233 from MNO 102 in order to decrypt the ciphertext included in message 233. The plaintext values from a message 233 can comprise the device certificate 101c and the "CertificateVerify" 232a. "CertificateVerify" 232a can comprise a digital signature from device 101 over the plaintext data within message 233 (but potentially excluding the digital signature for "CertificateVerify" 232a). At step 234, AUSF 103b can compare that received device certificate 101c from device 101 is the same as the received device certificate from device provider 104 in a message 213 above. AUSF 103b can trust or verify the received device certificate 101c from device 101 if the received device certificate 101c from device 101 in a message 233 is the same as the device certificate 101c received from device provider 104, such as in a message 213 via secure session 202. Or, if the received device certificate 101c from device 101 is not the same as 101c from device provider 104 (or AUSF 103b does not receive a device certificate 101c from device provider 104), then AUSF 103b can verify cert.device 101c through a certificate chain up to a securely recorded certificate in AUSF 103b such as a root certificate Cert.CI-root 105a.

At step 235, AUSF 103b can verify the digital signature value for "CertificateVerify" 232a using the device public key in cert.device 101c as well as the signature parameters in cert.device 101c. AUSF 103b can confirm the received value for "CertificateVerify" 232a matches an internally calculated value for "CertificateVerify" 232a. After successful device authentication in a step 235, AUSF 103b can conduct a step 236 in order to generate an anchor key for SEAF 102b and MNO 102. With EAP-TLS authentication between device 101 and AUSF 103b, the AUSF 103b and device 101 can mutually derive a key Kausf using the steps described in Annex B, section B.3 titled "Key Derivation" for 3GPP TS 33.501 version 15.1.0. AUSF 103b can conduct the steps to derive Kausf in a step 236. Although section B.3 describes the derivation of a Kausf in the context of EAP-TLS authentication using TLS version 1.2 with IETF RFC 5216, the equivalent steps can be conducted with a future version of EAP-TLS authentication supporting TLS version 1.3.

In summary, the successful handshake of messages 218, 227, and/or 233 can be used in a step 236 to derive a TLS mater secret as described in section 7.1 of RFC 8446. Data input into the derivation of a TLS master secret for AUSF 103b can comprise the shared secret 225a derived in a step 225 and the plaintext values for data transmitted in message 218 and 227. The shared secret 225a derived in a step 225 and the plaintext values for data transmitted in message 218 and 227 can be input in a step 236 into a key derivation function using a secure hash algorithm in order to derive a TLS master secret for AUSF 103b.

According the EAP-TLS authentication for RFC 5246, the derived TLS master secret can be input into a key derivation function such as described in section 2.3 titled "Key Hierarchy" of RFC 5246 in order to generate both a master session key (MSK) and an extended master session key (EMSK) 236b. For some exemplary embodiments, the extended master session key 236b can comprise a length of 512 bits. For exemplary embodiments, including those supporting 3GPP TS 33.501 versions 15.1.0, the first 256 bits of the EMSK 236b can be taken as the value for Kausf in a step 236 in order to select an anchor key 236a which could comprise Kausf. Note that (i) future versions of EAP-TLS authentication that explicitly support TLS version 1.3 can also derive a value of EMSK 236b from the TLS master secret as described in section 7.1 of RFC 8446, and (ii) future versions of 3GPP TS 33.501 can specify the derivation of Kausf from the EMSK 236b.

In exemplary embodiments, a step 236 can comprise (i) AUSF 103b mutually deriving a TLS master secret according to RFC 8446 with device 101, and then (ii) AUSF 103b mutually deriving with device 101 an anchor key such as Kausf using the mutually derived TLS master secret. An intermediate step between (i) and (ii) for both AUSF 103b and device 101 can be deriving an EMSK 236b according to IETF EAP-TLS standards, where the Kausf is derived from the EMSK 236b. Other possibilities for AUSF 103b to mutually derive a shared secret key (different than key 225a, but using at least key 225a) in a step 236 using data from a TLS session such as the keys and values within messages 218, 227, and/or 223 are possible as well without departing from the scope of the present invention.

After a step 236, AUSF 103b can send MNO 102 and SEAF 102b a message 237 through secure session 201, where message 237 can include both the mutually derived (between AUSF 103b and device 101) anchor key 236a, which could comprise a Kausf, and the value of SUPI 101a. Note that anchor key 236a can comprise a derived shared secret key that is mutually derived between AUSF 103b and device 101, and a different name than an "anchor key" of "Kausf" could be used to describe the key 236a, such as a shared secret, a derived shared secret, a shared secret key, etc. Or, in some exemplary embodiments an AUSF 103b could send the TLS master secret or EMSK 236b in a message 237, and an SEAF 102b could derive anchor key 236a from the TLS master secret or EMSK 236b received in a message 237. The SEAF 102b can receive message 237 and conduct a step 238 in order to process the message. In a step 238, SEAF 102b can conduct additional key derivations using the anchor key 236a such as Kasuf in order to derive an associated key set 238a Kseaf, Kamf, Kgnb, etc., as specified in 3GPP TS 33.501.

As depicted in FIG. 2, device 101 in a step 239 can conduct the equivalent steps as AUSF 103b in a step 236 in order to mutually derive a shared secret key such as an anchor key 236a or Kausf using at least the TLS master secret. Device 101 can use the steps specified in section 7.1 of TLS version 1.3 RFC 8446 in order to derive the TLS master secret. Data input into the derivation of a TLS master secret for device 101 can comprise the shared secret 225a derived in a step 228 and the plaintext values for data transmitted in message 218 and 227 (e.g. after decryption of a message 227). The shared secret 225a derived in a step 228 and the plaintext values for data transmitted in message 218 and 227 can be input into a key derivation function in order to derive a TLS master secret for device 101. The key derivation function can comprise a secure hash algorithm. Device 101 could take additional steps equivalent to those described in a step 236 above for an AUSF 103b to derive an EMSK 236b using at least derived TLS master secret. Corresponding to a step 236 for AUSF 103b above, a device 101 could derive an anchor key 236a from the EMSK 236b using standards specified for EAP-TLS authentication and/or 3GPP standards for 5G networks. A step 239 for device 101 can also comprise device 101 deriving an associated key set 239a using a derived Kausf from the TLS master secret for communication with MNO 102, such as a Kseaf, Kamf, Kgnb, etc. as specified in 3GPP TS 33.501.

After (i) a step 239 by device 101 to derive a shared secret key such as Kausf and related keys such as those specified in 3GPP TS 33.501 and (ii) a step 238 by MNO 102 with SEAF 102b to also use the shared secret such as Kausf received in a message 227 to derive related keys such as those specified in 3GPP TS 33.501, then device 101 and MNO 102 can exchange encrypted and integrity protected messages in RF communications 240. RF communications 240 can be conducted with keys 239a derived by device 101 in a step 239 and keys 238a derived from an anchor key by SEAF 102b in a step 238.

The steps for encrypting messages and also conducting integrity checks of messages in communications 240 can also be specified in 3GPP TS 33.501 and related standards. In addition, for embodiments where MNO 102 and device 101 use an 802.11 network instead of a 5G network, then device 101 and MNO 102 could use a least a portion of an EMSK 236b (derived from TLS master secret) in order to derive related encryption and integrity protection keys such as, but not limited to a pairwise transit key (PTK) in order to support the 802.11 network between device 101 and MNO 102. In summary, the encryption and integrity protection of messages in communications 240 are with keys derived from the TLS master secret, where the derivation of the TLS master secret is depicted and described above in a step 236 for AUSF 103b and a step 239 for device 101. In addition, the encryption and integrity protection of messages in communications 240 are with keys derived from shared secret 225a in a step 225 by AUSF 103b and the same shared secret 225a in a step 228 by device 101, since the TLS master secret for both nodes uses the shared secret 225a and data available to both device 101 and AUSF 103b such as the plaintext data in messages 218 and 227.

Note that the message 218 can include a random number generated by device 101 and the message 227 can include a random number generated by AUSF 103b, where the random numbers are also used in the derivation of the TLS master secret. In this manner, and by (i) including the random number generated by device 101 a message 218 and the random number generated by AUSF 103b in a message 227, and (ii) by including the data from a message 218 and a message 227 in the derivation of a TLS master secret, additional entropy or random values can be used by AUSF 103b and device 101 in addition to mutually derived shared secret 225a for the derivation of a TLS master secret. As described above, the TLS master secret can be used to derive a shared secret or an anchor key 236a for device 101 and AUSF 103b and MNO 102 to use in subsequent communications such as a connection for messages 240. In other words, at least a first random number within a "client hello" message 218 and a second random number within a "server hello" message 227, along with the shared secret 225a can be used by device 101 and AUSF 103b to derive a shared secret for subsequent communications 240, where the shared secret can comprise an anchor key 236a. For 802.11 networks between device 101 and MNO 102, the shared secret can comprise at least a portion of EMSK 236b.

For some exemplary embodiments, the wireless networking technology supported by MNO 102 can comprise WiFi networking supporting IEEE 802.11 standards. For these embodiments, the anchor key 236a sent in a message 237 through secure session 201 to MNO 102 can comprise any of (i) the shared secret key 225a, (ii) the TLS master secret derived in a step 236, and/or (iii) the value of EMSK 236b. In other words, when supporting WiFi networking for EAP-TLS authentication for device 101 and MNO 102, network 103 could send a mutually derived anchor key 236a that is different than a Kasuf as contemplated by 5G standards in 3GPP TS 33.501. Other possibilities exist as well for the structure or contents of a mutually derived anchor key 236a sent in a message 237 from network 103 to wireless network 102 without departing from the scope of the present invention. Further, when supporting 802.11 wireless networks for device 101 and MNO 101, the use of a SUCI according to 3GPP TS 33.501 can be optional, and the device identity as received by network 103 in a message 205 can comprise a SUPI 101a without encryption and also without the device ephemeral public key ePK.ECIES.Device 101h.

FIG. 3

FIG. 3 is an illustration of a device database and a network database with exemplary data stored, in accordance with exemplary embodiments. A device provider 104 could store and operate a device database 104d as depicted and described in connection with FIG. 1. Network 103 could store and operate a network database 104d in connection with FIG. 1. The device database 104d or network database 104d could be recorded in a server 111 or collection of servers securely connected to device provider 104 or network 103, respectively. Each database could operate using software such as Oracle, Microsoft SQL Server, MySQL, and other possibilities exist for a database without departing from the scope of the present disclosure.

Although both a device database 104d and network database 103d depict multiple values, strings, or numbers stored in each column and row, some values could be omitted at certain points in time, such as the data not being available at a point in time, although the omitted data could be provided or available later. For example, with a network database 103d, upon receipt of a message 205 with a new SUCI 101b not previously stored in a network database 103d, network 103 could insert a new row into a network database 103d with SUCI 101b entered and the other data empty, until later received in later messages (i) such as message 213 from device provider 104 or (ii) received from device 101 via MNO 102. Both device database 104d and network database 103d can be encrypted with a symmetric ciphering key such that the data is stored in physical memory such as storage 111b as ciphertext.

Values depicted in FIG. 3 with different numeral designations such as "-1", "-2", "-3", etc. can represent different numbers or strings for the depicted value such as SUPI 101a. Values depicted in FIG. 3 with the same numeral designation such as the first three rows of Provider ID 104a in a device database 104d being "104a-1", then "104a-1", then "104a-1" can represent that the number or string for provider ID 104a is the same for each of the devices in the first three rows. Values depicted in FIG. 3 with different numeral designation such as the last three rows of Provider ID 104a in a device database 104d being "104a-2", then "104a-2", then "104a-2" can represent that the number or string for provider ID 104a is different than each of the devices in the first three rows, which are depicted with a designation being "104a-1".

Device database 104d can record data for a plurality of devices 101 which could be managed or supported by device provider 104. A device database 104 could store values, numbers, or strings for a device number or index, a user name for a network access identifier (NAI), a device identity as a SUPI 101a, a device certificate 101c, a provider identity 104a, a provider certificate 104c, a provider secret key 104e, ECIES secret key 104b, and ECIES parameters 101f. Data within a device database 104d could be recorded or stored before device 101 establishes an initial radio resource connection with MNO 102, such as during device manufacturing or distribution or a device configuration, and other possibilities exist as well for the time before a message 205 when data for device database 104d is recorded. As additional devices are added to device provider 104, then additional rows for the additional devices could be inserted into a device database 104d.

As depicted in FIG. 3, a device database could store additional data for a device 101 than the fields or values depicted. Additional data could include the ECIES ephemeral public key 101h received in a message 209 by device provider 104, the SUCI 101b used by a device 101 or a device user name associated with a device 101. In addition, although not depicted for a device database 104d in FIG. 3, a device database 103d could also store a first list of cryptographic algorithms 101s and a second list of cryptographic parameters 101x for a device 101 with SUPI 101a in a device database 104d, where the first list and the second list could be used to determine extensions 219d from an AUSF 103b are supported by device 101. The first list and the second list could also be sent to network 103 in message 213 in FIG. 2 above. Other possibilities exist as well for data stored or recorded in a device database 104d without departing from the scope of the present disclosure.

Although a single device database 104d is depicted in FIG. 3, a device database 104d could comprise either multiple databases or multiple tables with data equivalent or similar to that depicted in FIG. 3. In one exemplary embodiment, a device provider 104 could operate multiple device databases 104d, where a first device database 104d is associated with a first network 103 and a second device database 104d is associated with a second network 103, etc. The realm values for a NAI within a SUCI or SUPI could include a first value for the network portion and/or provider portion of the realm for the first network and first device database. The realm values for a NAI within a SUCI or SUPI could include a second value for the network portion and/or provider portion of the realm for the second network and second device database.

The user name in a device database can comprise the user name portion of a network access identifier (NAI) for a SUPI 101a. The SUPI 101a stored in a device database 104d can comprise the SUPI 101a as described above for a device 101 in FIG. 1. Note that the user name can be plaintext with a SUPI. In addition, a "user name" can comprise an identity for a device 101 and a "user name" does not need to be associated with a person. Device certificate 101c stored in a device database 101d can comprise the device certificate 101c stored and used by device 101 as described for a device 101 in FIG. 1. The format and data structure of device certificate 101c in a network database 103d, device provider database 104d, and device 101 could take many forms such as a *.pem structure, raw text, *.crt, or *.der. *.crt can comprise a certificate format and *.der can comprise distinguished encoding rules for the certificate. Other certificates described herein, including device provider certificate 104c could be stored or transmitted in any of the exemplary formats described in the previous sentence.

The provider ID 104a stored in a device database 104d can comprise the provider identity used in the realm portion of a SUCI 101b and SUPI 101a for a device 101. The provider ID 104a in a device database 104d can also comprise the identity for a device provider stored in a provider certificate 104c, such as an identity in the "common name" field or also possibly a portion of the "subject alternative name", and other possibilities exist as well for the location of the provider ID 104a within provider certificate 104c. Note that the provider ID 104a in a SUCI 101b or SUPI 101a is not required to equal or be the same as a provider ID 104a in the provider certificate 104c. A database 104d can store the provider ID 104a in the provider certificate 104c and also the different provider ID 104a in the SUPI 101a. Provider certificate 104c can be stored in device database 104d, network database 103d, and device 101 in a format or structure similar to device certificate 101c described in the paragraph above. In some exemplary embodiments provider certificate 104c can comprise a certificate in *.pem format.

The device provider certificate 104c in a device database 104d and network database 103d can comprise the device provider certificate 104c depicted and described in FIG. 1 and FIG. 2. As depicted in FIG. 3, different devices 101 can use different provider certificates 104c, which is also depicted in device database 104d and network database 103d. Note that the same provider ID 104a can be used with different provider certificates 104c, such as provider ID "104a-2" being associated with both provider certificate "104c-2" and provider certificate "104c-3". For this embodiment, the same provider ID 104a could be used with two different certificates with different parameters such as different certificate expiration dates or different key lengths or key names or different elliptic curves used for the public keys, etc., such that different devices 101 could use different provider certificates 104c. In addition, a device 101 using a SUPI 101a could store or be associated with a plurality of different device provider certificates 104c, and the multiple different device provider certificates 104c could be stored for the device 101 in a device database 104d. A specific device provider certificate 104c for the device 101 could be selected based on the network 103 or MNO 102 communicating with device 101, such as parameters supported by the network 103 or MNO 102, where the parameters could be received by device provider 104 via secure session 202.

In exemplary embodiments, the server certificate for a network 103 when conducting an EAP-TLS authentication with device 101 can use the device provider certificate 104c, where the different server certificates used by network 103 and AUSF 103b are selected in a step 219b and identified based on the provider ID 104a in the realm of the SUPI 101a or SUCI 101b. Also note that a device database 104d and a network database 103d could record unique certificate identities for the depicted certificates, and the full certificates as exemplary *.pem files could be stored outside of a database (but identified by the unique certificate identities).

The provider secret key 104e for a provider certificate 104c can be used with the provider public key stored with the device provider certificate 104c. The use of a provider secret key 104e was described above in FIG. 1 and FIG. 2, such as selecting in a step 222 the provider secret key 104e from a device database 104d based on data in a message 220 such as a device provider certificate 104c for the "message to sign". Device provider 104 could use the selected device provider secret key 104e in order to conduct the step 222 to create or generate the "Certificate Verify" 222a portion or segment of the TLS "server hello" message subsequent sent by AUSF 103b in a message 227 in FIG. 2.

Device database 104d can also store values of ECIES secret key 104b, which corresponds to the ECIES public key 101e stored by device 101. Note that in some exemplary embodiments a device provider 104 can select the ECIES secret key 104b based on the provider ID 104a received within a realm value for the SUCI 101b from a message 209 as depicted in FIG. 2. In other words, in exemplary embodiments, there can be a one-to-one mapping or a unique mapping between ECIES secret key 104b and the provider ID 104a in a realm for a device provider 104 in a SUCI 101b from message 209 using a device database 104d. In this manner, a device provider can know which ECIES secret key 104b to use for a plurality of devices 101, where the ECIES secret key 104b to use with an ECIES decryption function 104j can be identified based on the provider ID 104a received in a realm of the SUCI 101b.

Although exemplary data is depicted within a single table within device database 104d in FIG. 3, a device database 104d could include multiple different tables. As one example, a separate table could include a "one-to-one" mapping between a provider ID 104a, which could be included in the realm portion of a SUCI 101b, and the value ECIES secret key 104b and the value of ECIES parameters 101f. Note that a device database 104d could also store the of ECIES parameters 101f in a device database 104d, which can specify parameters for use with the ECIES secret key 104b, such as use of curve 25519 for a first ECIES secret key 104b and the use of curve P-256 for a second ECIES secret key 104b, and other possibilities exist as well.

As depicted in FIG. 1, a network 103 could store and operate a network database 103d. Either device database 104d or network database 103d could comprise a collection of servers and storage memory for storing values associated with a plurality of devices in order to support the operation of a system 200 or a system 100. A network database 103d could store values, strings, or numbers for Device identity/SUCI 101b, Device identity/SUPI 101a, Device Certificate 101c, Provider Certificate 104c, TLS Server Ephemeral secret key 103q, TLS Device Ephemeral public key 101n, Shared Secret 225a, Symmetric key 225b, EMSK 236b, and Anchor Key 236a. Additional supporting data for a system 200 could be stored or recorded in a network database 103d as well without departing from the scope of the present disclosure.

Data within a network database 103d could be recorded or stored as network 103 receives data for a device 101 from a MNO 102 and a device provider 104. For example, as a network 103 receives a SUCI 101b for a device 101 from a MNO 102 after device 101 established a radio resource connection with MNO 102 and MNO 102 forwards the SUCI 101b in a message 205 in FIG. 2, then the value for SUCI 101b could be added to the network database 103d. As additional data from additional devices 101 is received by network 103, then additional rows for the additional devices could be inserted into a network database 103d. A network database could store additional data or columns for a device 101 than the fields or values depicted.

Additional data in a network database 103d could include the ECIES ephemeral public key 101e received in a message 205 by network 103, and an identity of MNO 102 of MNO ID 102a that sent a message 205. For embodiments where network 103 uses a new server certificate instead of a device provider certificate 104c in the "server hello message" (as described above for an alternative embodiment of message 220 with a "certificate signing request"), then the new server certificate or an identity of the new server certificate could be stored for a device 101 along with the SUCI 101b. Additional data in a network database 103d could include the selected extensions 219d used for generating a "server hello" in message 227, where the extensions 219d could be selected in a step 219c in FIG. 2 above and other possibilities exist as well without departing from the scope of the present disclosure.

Although a single network database 103d is depicted in FIG. 3, a network database 103d could comprise either multiple databases or multiple tables with data equivalent or similar to that depicted in FIG. 3. In one exemplary embodiment, a network 103 could operate multiple network databases 103d, where a first network database 103d is associated with a first device provider 104 and a second network database 104d is associated with a second device provider 104, etc. The realm values for a NAI within a SUCI or SUPI could include a first value for the device provider portion the realm for the first device provider and first device database. The realm values for a NAI within a SUCI or SUPI could include a second value for the device provider portion of the realm for the second device provider and second device database.

Values for Device identity/SUCI 101b in a network database 103d could be received in a message 205 from MNO 102 in FIG. 2. Values in a network database 103d of Device identity/SUPI 101a, Device Certificate 101c, and Provider Certificate 104c could be received in a message 213 in FIG. 2. Values for TLS Server Ephemeral secret key 103q could be derived in a step 103q' as depicted and described in connection with a step 103q' in FIG. 2. Values for TLS Device Ephemeral public key 101n in a network database 103d could be received in a message 218 from FIG. 2. Values for shared secret key 225a and symmetric ciphering key 225b could be derived in a step 225 in FIG. 2. Values for EMSK 236b and an anchor key 236a or Kausf could be derived in a step 236 in FIG. 2.

Network 103 can use the data recorded in a network database 103d in order to conduct the series of steps and process the series of messages as depicted and described in connection with FIG. 2. As one example and as described for a step 219b, network 103 and/or AUSF 103b could use data recorded in a network database 103d with the SUCI 101b value from a message 218a to select at least a device provider certificate 104c as the server certificate to use with EAP-TLS authentication and the generation of a "server hello" in message 227. The values for TLS Server Ephemeral secret key 103q and TLS Device Ephemeral public key 101n, along with associated parameters could be selected in a step 225 using the SUCI 101b from a message 218a in order to conduct a step 225 to generate the shared secret 225a and the symmetric ciphering key 225b. The ciphertext in a "server hello" within message 227 can be encrypted with the symmetric ciphering key 225b and the ciphertext in a message 233 can be decrypted with the symmetric ciphering key 225b from a network database 103d. The message 233 can be received from MNO 102 with a SUCI 101b, and the symmetric ciphering key 225b selected for decryption from the network database 103d using the SUCI 101b.

The received device certificate 101c decrypted from a message 233 using the symmetric ciphering key 225b can be compared with the device certificate 101c stored in a database for SUCI 101b using a step 224. Network 103 can derive an anchor key 236a for a device 101 with a SUCI 101b using at least the shared secret 225a and the EMSK 236b stored in a network database 103d for the SUCI 101b. Additional examples for the use of data in a network database 103d were provided in FIG. 2 above, and other possibilities exist as well for a network 102 and/or an AUSF 102b to store and use data from a network database 103d without departing from the scope of the present disclosure.

CONCLUSION

Various exemplary embodiments have been described above. Those skilled in the art will understand, however, that changes and modifications may be made to those examples without departing from the scope of the claims.

The invention claimed is:

1. A method for a server system to support an EAP-TLS authentication with a device, the method performed by the server system, the method comprising:
   a) receiving, from a wireless network, a subscriber concealed identifier (SUCI), a first device ephemeral public key, and a plaintext realm for a network access identifier;
   b) sending, to a device controller at the plaintext realm, the SUCI and the first device ephemeral public key;
   c) receiving, from the device controller, a subscriber permanent identifier (SUPI), a certificate for the device, and a device controller certificate;
   d) receiving, from the wireless network, a "client hello" message for the device with at least a second device ephemeral public key;
   e) deriving a server ephemeral private key and a corresponding server ephemeral public key;
   f) sending, to the device controller, at least the derived server ephemeral public key and server extensions for the "client hello" message;
   g) receiving, from the device controller, a server digital signature over at least the derived server ephemeral public key, the device controller certificate, and the server extensions, wherein the server digital signature is generated by the device controller using at least a device controller private key corresponding to a device controller public key in the device controller certificate;
   h) generating (i) a shared secret key using at least the second device ephemeral public key and the server ephemeral private key and (ii) a shared symmetric ciphering key using at least the shared secret key;
   i) sending, to the wireless network, a "server hello" message with at least the derived server ephemeral public key, the device controller certificate, the server extensions, and the server digital signature, wherein at least the device controller certificate and the server digital signature in the "server hello" message are encrypted with the shared symmetric ciphering key;
   j) received a "client finished" message comprising the certificate for the device and a device digital signature over the certificate for the device; and
   k) generating an anchor key for the wireless network using at least the shared secret key, the "client" message, and the "server hello" message.

2. The method of claim 1, wherein the "client hello" message and the "server hello" message support a Transport Layer Security version 1.3, and wherein the device generates the "client hello" message.

3. The method of claim 1, wherein the SUCI includes a domain name for the device controller as a first plaintext and a user name for the device as a ciphertext, and wherein the SUPI includes the user name for the device as a second plaintext.

4. The method of claim 1, wherein the "client hello" message includes client extensions, and wherein the client extensions include cryptographic parameters, and wherein the server ephemeral private key, the corresponding server ephemeral public key, and the second device ephemeral public key support the cryptographic parameters.

5. The method of claim 4, further comprising generating, by the server system, the shared secret using an elliptic curve Diffie Hellman (ECDH) key exchange and the cryptographic parameters.

6. The method of claim 1, wherein the server system comprises at least one server and an authentication server function (AUSF).

7. The method of claim 1, wherein device controller records a secret key, and wherein the device controller decrypts at least a portion of the SUCI using the secret key and the first device ephemeral public key in order to determine the SUPI for the device.

8. The method of claim 1, wherein the device stores the device controller certificate before the device sends the SUCI to the wireless network, and wherein the device verifies the digital signature using at least the device controller public key in the device controller certificate.

9. The method of claim 1, wherein the wireless network encrypts data for the device using at least the anchor key.

10. The method of claim 1, further comprising generating the shared symmetric ciphering key using at least the shared secret key and a key derivation function with the shared secret key, and wherein the key derivation function uses a secure hash algorithm.

11. The method of claim 1, further comprising, after step i) and before step j), receiving from the device a "client finished" message with a certificate verify for the device, wherein the server system verifies the certificate verify using the device certificate.

12. The method of claim 11, further comprising generating the anchor key for the wireless network using at least the shared secret key, the "client hello" message, the "server hello" message, and the "client finished" message.

13. The method of claim 1, wherein the server system sends the wireless network the anchor key through a secure session established between the server system and the wireless network.

14. The method of claim 1, wherein the SUCI includes a plaintext realm for the device controller, and wherein the server system uses the plaintext realm to send the SUCI and the first device ephemeral public key to the device controller.

15. A method for a server system to support an EAP-TLS authentication with a device, the method performed by the server system, the method comprising:
   a) storing a static private key and cryptographic parameters, wherein the device stores a static public key corresponding to the static private key and the cryptographic parameters;

b) receiving, from a wireless network, a subscriber concealed identifier (SUCI) and a first device ephemeral public key for the cryptographic parameters, wherein the SUCI includes a realm for a device controller as a first plaintext;
c) decrypting the SUCI using at least the static private key and the first device ephemeral public key in order to read a subscriber permanent identifier (SUPI);
d) sending, to a device controller at the realm, at least a user name for the SUPI;
e) receiving, from the device controller, a certificate for the device and a device controller certificate;
f) receiving, from the wireless network, a "client hello" message for the device with at least a second device ephemeral public key;
g) deriving a server ephemeral private key and a corresponding server ephemeral public key;
h) sending, to the device controller, at least the derived server ephemeral public key and server extensions for the "client hello" message;
i) receiving, from the device controller, a server digital signature over at least the derived server ephemeral public key, the device controller certificate, and the server extensions wherein the server digital signature is generated by the device controller using at least a device controller private key corresponding to a device controller public key in the device controller certificate;
j) generating (i) a shared secret key using at least the second device ephemeral public key and the server ephemeral private key and (ii) a shared symmetric ciphering key using at least the shared secret key;
k) sending, to the wireless network, the SUCI, a "server hello" message with at least the derived server ephemeral public key, the device controller certificate, and the server digital signature, wherein at least the device controller certificate, the server extensions and the server digital signature in the "server hello" message are encrypted with the shared symmetric ciphering key;
l) receiving a "client finished" message comprising the certificate for the device and a device digital signature over the certificate for the device; and
m) generating an anchor key for the wireless network using at least the shared secret key, the "client hello" message, and the "server hello" message.

16. The method of claim 15, wherein the "client hello" message and the "server hello" message support a Transport Layer Security version 1.3, and wherein the device generates the "client hello" message.

17. The method of claim 15, wherein the SUCI includes a user name for the device as a ciphertext, and wherein the SUPI includes the user name for the device as a second plaintext.

18. The method of claim 15, wherein the "client hello" message includes client extensions, and wherein the client extensions include cryptographic parameters, and wherein the server ephemeral private key, the corresponding server ephemeral public key, and the second device ephemeral public key support the cryptographic parameters.

19. The method of claim 18, further comprising generating, by the server system, the shared secret using an elliptic curve Diffie Hellman (ECDH) key exchange and the cryptographic parameters.

20. The method of claim 15, wherein the server system comprises at least one server and an authentication server function (AUSF).

21. The method of claim 15, wherein device controller stores a device database for a plurality of devices, and wherein the device controller queries the device database with the user name in order to send the server system the certificate for the device and the device controller certificate.

22. The method of claim 15, wherein the device stores the device controller certificate before the device sends the SUCI to the wireless network, and wherein the device verifies the server digital signature using at least the device controller public key in the device controller certificate.

23. The method of claim 15, wherein the wireless network encrypts data for the device using at least the anchor key.

24. The method of claim 15, further comprising generating the shared symmetric ciphering key using at least the shared secret key and a key derivation function with the shared secret key, and wherein the key derivation function uses a secure hash algorithm.

25. The method of claim 15, further comprising, after step i) and before step j), receiving from the device a "client finished" message with a certificate verify for the device, wherein the server system verifies the certificate verify using the device certificate.

26. The method of claim 25, further comprising generating the anchor key for the wireless network using at least the shared secret key, the "client hello" message, the "server hello" message, and the "client finished" message.

27. The method of claim 15, wherein the server system sends the wireless network the anchor key through a secure session established between the server system and the wireless network.

28. The method of claim 15, wherein the device stores a first device ephemeral private key for the first device ephemeral public key, and wherein the device encrypts the SUPI using the static public key and the first device ephemeral private key in order to generate the SUCI, and wherein the device sends the SUCI to the wireless network.

* * * * *